（12）United States Patent
Fox et al.

(10) Patent No.: US 12,002,143 B2
(45) Date of Patent: Jun. 4, 2024

(54) PREDICTION AND USE OF PROCESSOR INACTIVITY FOR RENDERING FRAMES

(71) Applicant: Apple Inc., Cupertino, CA (US)

(72) Inventors: Tyler M. Fox, Santa Clara, CA (US); Andrey Pokrovskiy, Mountain View, CA (US); Aditya Krishnadevan, Santa Clara, CA (US); James R. Montgomerie, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 99 days.

(21) Appl. No.: 17/653,087

(22) Filed: Mar. 1, 2022

(65) Prior Publication Data

US 2022/0392137 A1 Dec. 8, 2022

Related U.S. Application Data

(60) Provisional application No. 63/197,435, filed on Jun. 6, 2021.

(51) Int. Cl.
*G06T 15/00* (2011.01)
*G09G 5/00* (2006.01)

(52) U.S. Cl.
CPC ........... *G06T 15/005* (2013.01); *G09G 5/003* (2013.01); *G09G 2320/103* (2013.01)

(58) Field of Classification Search
CPC ...................... G06T 15/005; G06T 1/20; G06T 2207/10016; G06T 2207/20081; G06T 11/005; G06T 15/00; G06T 2207/20021; G06T 1/00; G06T 15/08; G09G 5/003; G09G 2320/103; G09G 2330/021; G09G 2320/0252

See application file for complete search history.

(56) References Cited

U.S. PATENT DOCUMENTS

| 2014/0354659 | A1* | 12/2014 | Apodaca | G06F 1/329 345/522 |
|---|---|---|---|---|
| 2018/0300838 | A1* | 10/2018 | Park | G06F 3/14 |
| 2020/0279533 | A1* | 9/2020 | Fan | G09G 5/12 |
| 2021/0096917 | A1* | 4/2021 | Cerny | G06F 9/5083 |

* cited by examiner

*Primary Examiner* — Xilin Guo
(74) *Attorney, Agent, or Firm* — Kilpatrick Townsend & Stockton LLP

(57) ABSTRACT

A computing device performs a first operation before a first commit deadline, resulting in a first frame being rendered and displayed in a first cycle. A second operation is performed, before a second commit deadline, resulting in a second frame being rendered and displayed in a second cycle. A time remaining to a third commit deadline is determined, using the current time. A third operation is predicted, performable before a third commit deadline. An additional operation is predicted, performable for a future cycle. A total processing time for the third and additional operations is determined, being less than the remaining time. The third and additional operations are performed for use in a future cycle. The result of the third operation is used to render a third frame for the third cycle. The result of the additional operation is used to render an additional frame before a future render deadline.

19 Claims, 9 Drawing Sheets

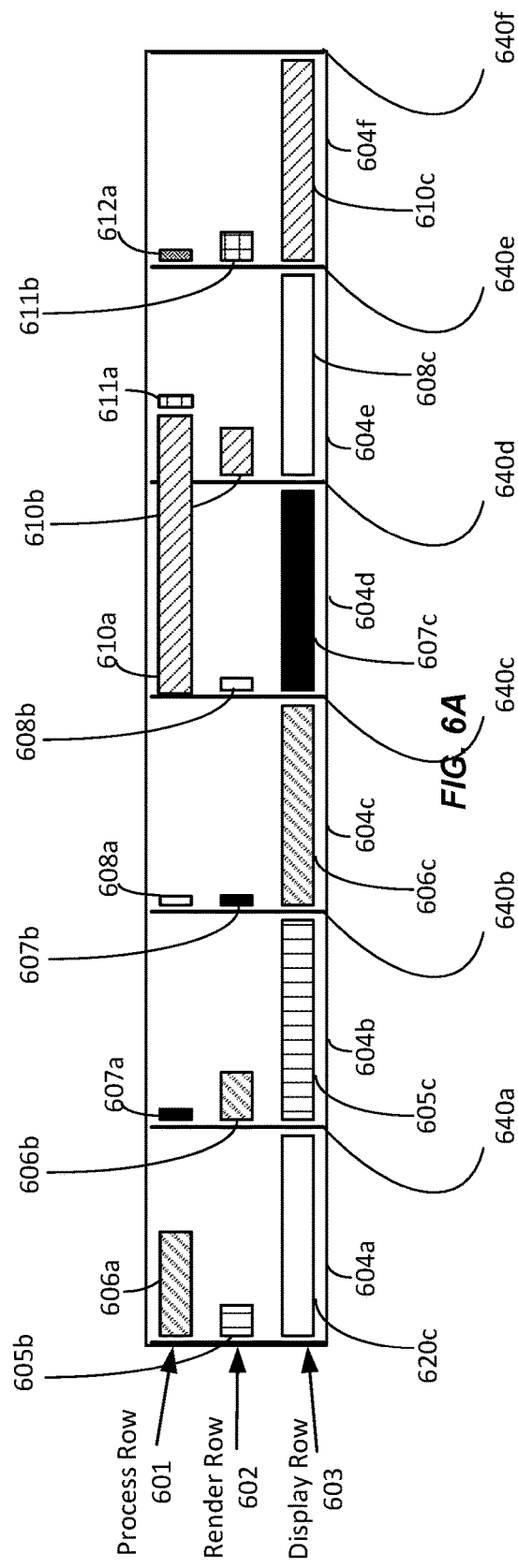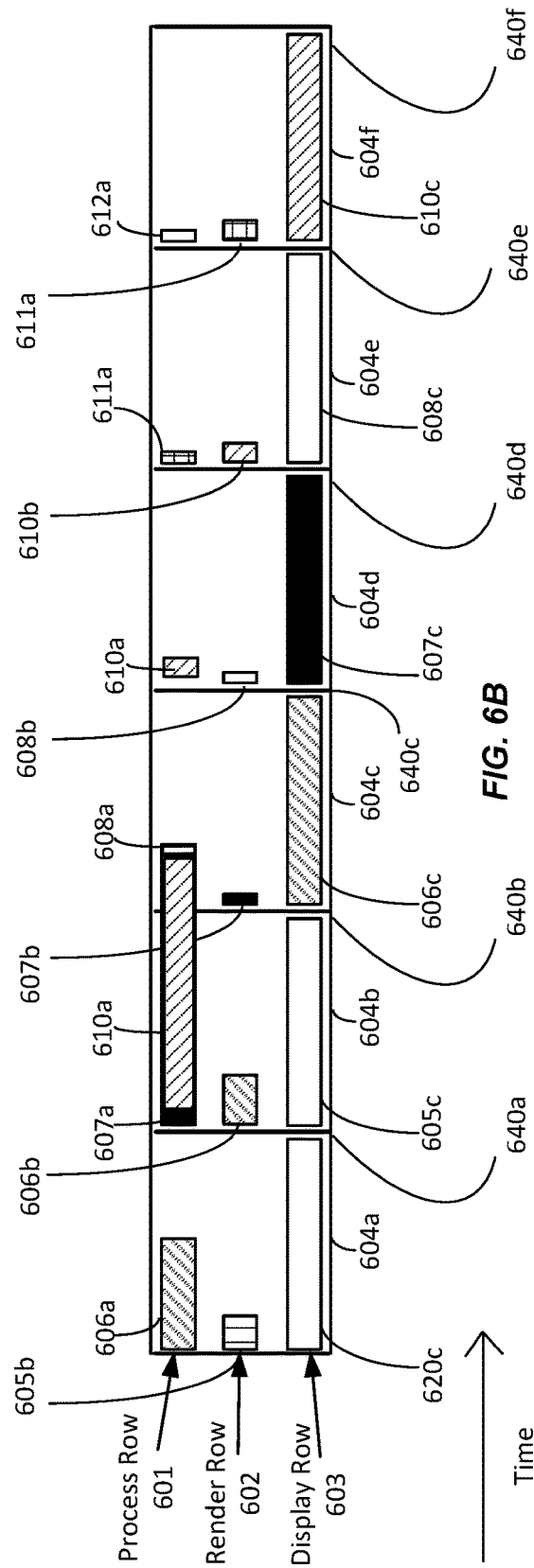

PREDICTION AND USE OF PROCESSOR INACTIVITY FOR RENDERING FRAMES

CROSS-REFERENCES TO RELATED APPLICATIONS

This application claims priority under 35 U.S.C. § 119(e) to U.S. Provisional Application No. 63/197,435, filed on Jun. 6, 2021 entitled, "PREDICTION AND USE OF PROCESSOR INACTIVITY FOR RENDERING FRAMES," the contents of which are herein incorporated by reference.

BACKGROUND

Current computing devices access, process, and commit data for use in rendering an image to be displayed based on user inputs. All data should be processed before a commit deadline, set in part by a refresh rate. If a user causes a computing device to attempt to display data that has not been accessed, processed, and committed before the commit deadline, then the user may experience a hitch. As the refresh rate increases, the time between commit deadlines is reduced. At the same time, the data needed to process operations may increase. This increases the frequency of hitches experienced by a user.

BRIEF SUMMARY

Certain embodiments are directed at techniques for predicting and utilizing periods of processor inactivity for rendering frames. Additional operations may be predicted and selected based on their needed processing time and other relevant information, including power settings. Additional operations can then be scheduled for processing such that any operations are completed before an associated commit deadline. The additional operation can then be processed during periods of processor inactivity, ensuring operations needed for a future frame are completed before its associated commit deadline.

For example, embodiments can include performing a first operation before a first commit deadline. The result of the first operation can be used for rendering a first frame, which is then displayed during a first cycle on the display of a computing device. A second operation may then be performed where the second operation is completed before a second commit deadline, with its result being rendered in a second cycle for a second frame. A time remaining until a third commit deadline can be determined, relative to a current time. A third operation can be predicted, to be performed before a third commit deadline for a third cycle. An additional operation may then be predicted, which can be performed for cycles after the third cycle. A total processing time of the third operation and the additional operation may be determined that is less than the remaining time to the third commit deadline. The third operation and additional operation can be performed to be used in a future cycle. Subsequently, the result of the third operation can be used to render a third frame for the third cycle, and the result of the additional operation can be used to render an additional frame for the future cycle before a future render deadline.

In some embodiments, the commit deadlines may be set at regular intervals, based on a refresh rate (e.g., a static refresh rate of a display, a variable system refresh rate determined by a system component, etc.), or be of variable periodicity. The remaining time may be determined by an update scheduler. The update scheduler may also determine the commit deadlines.

According to certain embodiments, the additional operation may be predicted using a prediction engine, e.g., one of a plurality of prediction engines. The future operation can be selected from a plurality of operations that have a likelihood of future operation that is above a threshold. In some embodiments, the additional operation can be a prefetch operation, where associated data is accessed and processed before a request Other embodiments can include performing a first operation before a first commit deadline, where the result of the operation is used to render a first frame. This operation can be performed by one or more processing elements at a first power setting. The first frame can be displayed in a first cycle of the display of a computing device. Then, a second operation may be identified, and used to render a second frame for display in a second cycle before a second commit deadline for the second cycle. A second power level, lower than the first power setting, may be determined such that the second operation can be performed before the second commit deadline. The second operation can then be performed by the processing elements at the second power setting. The result of the second operation can be rendered for the second frame of the second cycle.

Determining the second power setting can include comparing the completion time using a first power setting to the remaining time relative to the first setting.

These and other embodiments of the disclosure are described in detail below. For example, other embodiments are directed to systems, devices, and computer readable media associated with methods described herein.

A better understanding of the nature and advantages of embodiments of the present disclosure may be gained with reference to the following detailed description and the accompanying drawings.

BRIEF DESCRIPTION OF THE DRAWINGS

FIG. 6A is a simplified diagram of an operations cycle with an expensive cell running according to a typical processing schedule that may be improved according to embodiments of the present disclosure.

FIG. 6B is a simplified diagram of an operations cycle performing an additional operation for an expensive cell according to embodiments of the present disclosure.

DETAILED DESCRIPTION

Figure 1:
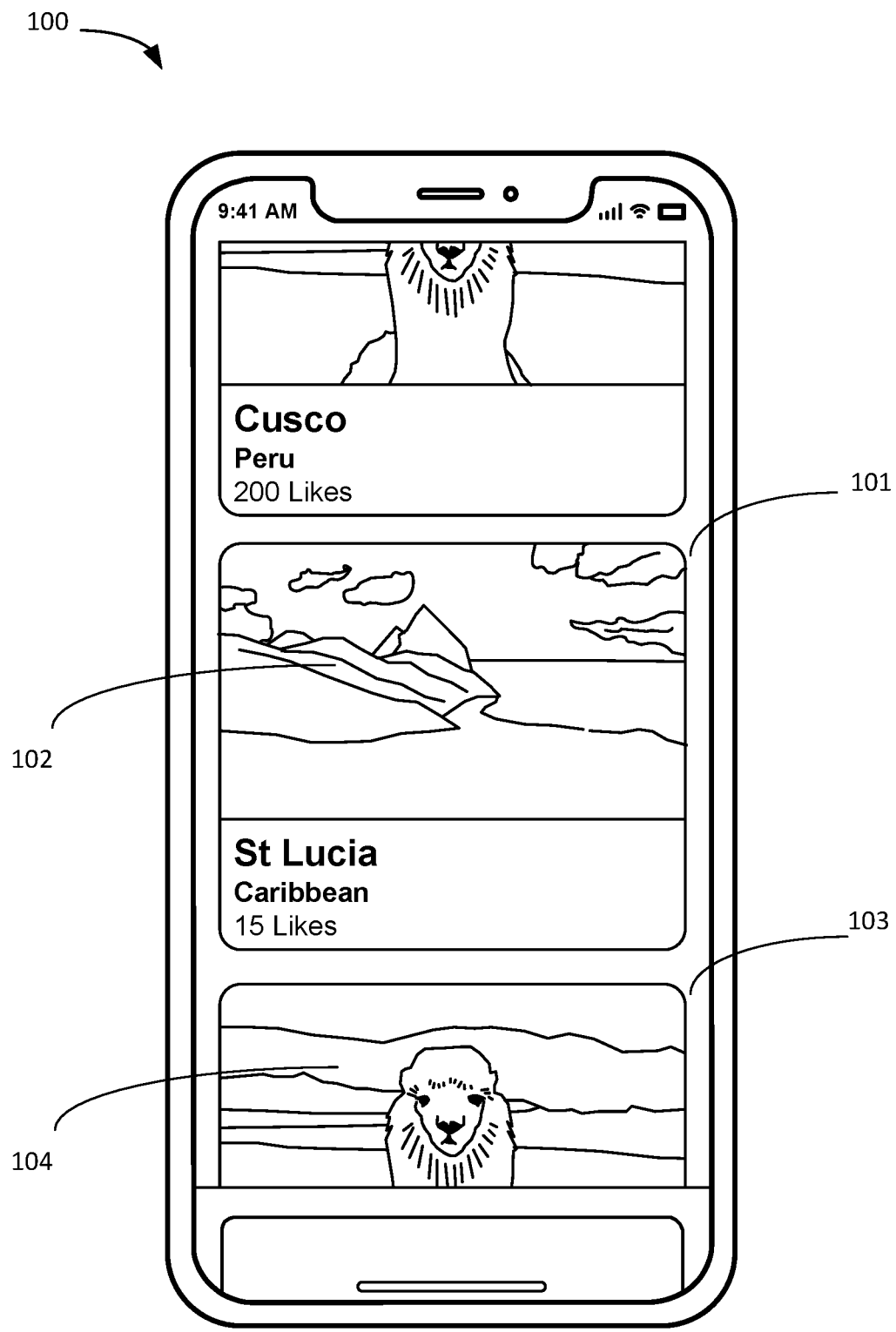
FIG. 1 illustrates an example environment where hitches may occur.

Computing devices access and process data associated with an image or cell prior to sending the data to a render module for rendering. The render module may then render the data associated with the image or cell, in some cases combining this data with data associated with other images or cells, to assemble a frame for display. After rendering all data for a given frame, the frame can be displayed by the computing device, either as a next frame or some other future frame. If data is needed to render a frame, but it has not finished committing by the deadline, then the user will experience a hitch. As refresh rates increase, and the processing requirements for operations needed to render images grow, the allowable time to process an operation decreases. This leads to a higher occurrence of hitches.

Some embodiments improve display performance, reducing hitches through utilizing periods of processor inactivity. Once a computing device identifies a period of processor inactivity, a future operation may be identified. After determining that the time remaining before the next deadline is less than a total processing time, the future operation (sometimes called "additional operation") may be scheduled and completed. By utilizing periods of processor inactivity to perform operations without exceeding commit deadlines, display performance can be improved, and users experience fewer hitches. Following is a brief explanation of processing, rendering, and display synchronization. Then, specific embodiments are disclosed which allow future operations to be identified, scheduled, and completed before an associated commit deadline.

I. Example Commits and Rendering for Frames

Displays have refresh rates, a measure of how often a display maybe updated with new data. Refresh rates are generally static, each display having a characteristic refresh rate. However, in some embodiments, a variable system refresh rates is determined, and this system refresh rate can change based on various conditions or events. Common refresh rates include 60 Hz, 120 HZ, and 240 Hz. These rates are merely examples, with refresh rates varying both higher than 240 Hz and lower than 60 Hz.

Each time a display is refreshed, a new frame is displayed. This means that a new frame should be fully rendered at least at the same rate as the refresh rate (e.g., a static refresh rate of a display, a variable system refresh rate determined by a system component, etc.). Before the frame can be rendered, all associated data should be accessed, processed and committed to the render module. Data is committed when it is sent to a render module for display instead of being held for some future operation. All data should be committed before a commit deadline, set in part by the refresh rate. Because the render module should render frames at least as quickly as the refresh rate, other operations performed by the computing device should also be scheduled such that data is committed to the render module before a commit deadline.

The synchronization of the processing of operations and committing the results to a render module is done through vertical synchronization (VSync). In many instances, VSync operability sets regular commit deadlines. Often, the commit deadlines are the same as the refresh rate (e.g., a static refresh rate of a display, a variable system refresh rate determined by a system component, etc.). The processing of operations, the result of which can be used for rendering an image, rendering of images, and ultimate display of those images are therefore scheduled according to a computing device's VSync rate. However, frames may vary in the amount of data which needs to be processed before being committed, and thus not all the time between commit deadlines is used identically for each operation. To render a frame at a specified refresh rate, the data for a frame should be committed by a certain deadline, or else a hitch may occur. Scrolling operations provide one example of how different frames may have different processing requirements.

FIG. 1 shows a typical environment using a scrolling operation with varying processing requirements. Computing device 100 is currently displaying a frame fully containing cell 101 having image 102. Cell 103 and its associated image 104 are only partially displayed in the current frame. A user may scroll to view image 104 in its entirety. As a scrolling operation upward is performed, the computing device should have all viewable portions of any images processed and committed before a commit deadline, such that the following frame can display the appropriate portion of cell 103 and image 104.

Prior to displaying a frame with cell 103, a first operation accesses, processes, and commits image 104 and other data associated with cell 103 to a render module. As seen in FIG. 1, only a portion of cell 103 and image 104 needs to be displayed. A second operation, initiated by a user scrolling to view the remaining portion of cell 103, requires just the unseen portion of cell 103 to be rendered. The processing involved in the second operation may determine how much of cell 103 to display based on the scrolling operation.

In this example, the first operation (accessing and processing data associated with cell 103) uses significantly more processing power and time than the second operation, determining a portion of cell 103 to display. Despite the disparity in processing power and time required, the commit deadline for each operation should be met in order to have the next frame rendered in accordance with a current refresh rate (e.g., a static refresh rate of a display, a variable system refresh rate determined by a system component, etc.). Thus, the processing and committing of both operations should be synchronized to the refresh rate. But problems can occur when the first operation is too large and cannot complete before its corresponding commit deadline.

The synchronization of the processing of operations and committing the results to a render module is done through vertical synchronization (VSync). In many instances, VSync operability sets regular commit deadlines. Often, the commit deadlines are the same as the refresh rate (e.g., a static refresh rate of a display, a variable system refresh rate determined by a system component, etc.). The processing of operations, the results of which can be used for rendering an image, rendering of images, and ultimate display of those images, are therefore scheduled according to a computing device's VSync rate.

Figure 2:
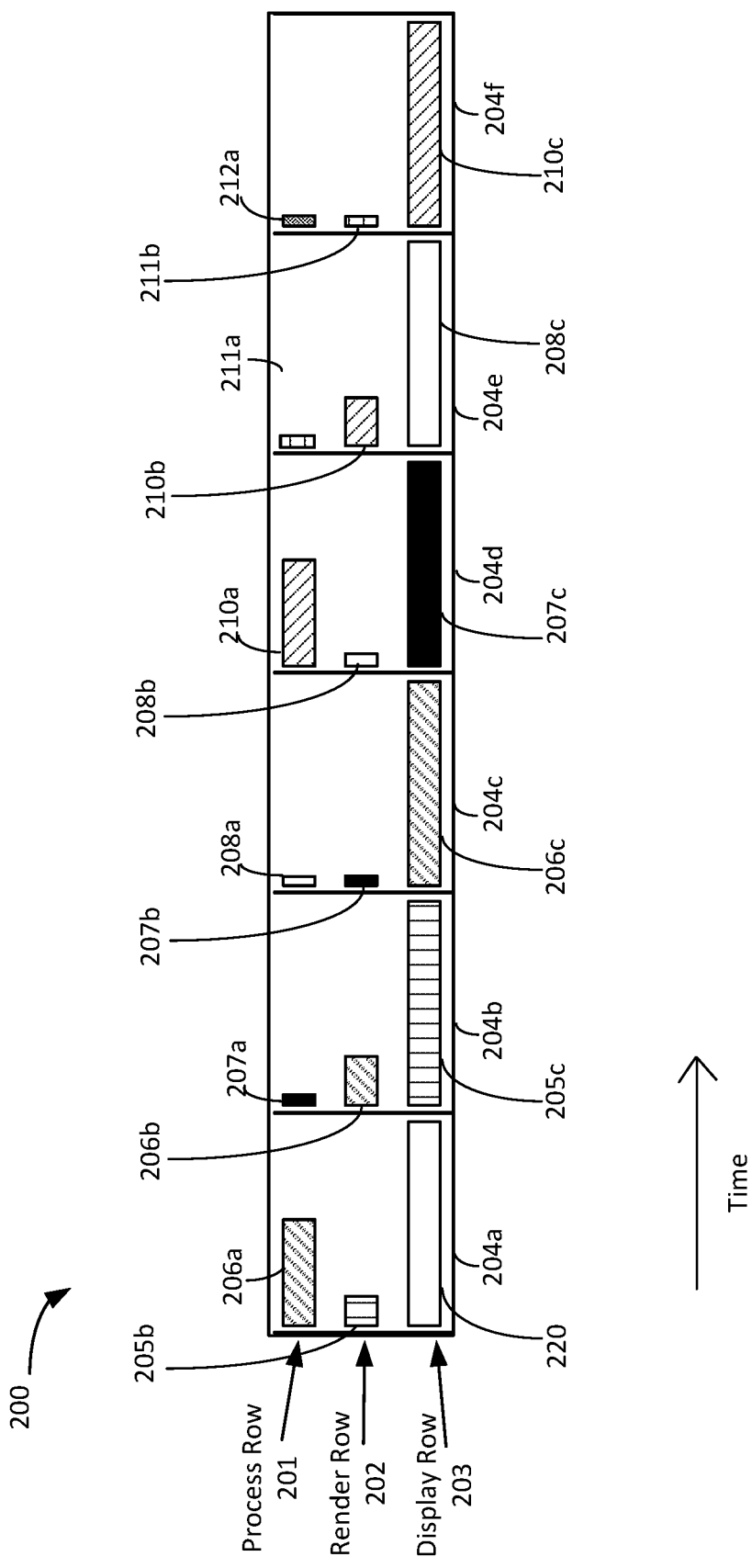
FIG. 2 is a simplified diagram of an operations cycle running according to a typical VSync schedule.

FIG. 2 is a simplified diagram of an operations cycle running according to a typical VSync schedule. Block 200 shows a cycle of operations occurring within cycles 204a-f. Each of cycles 204a-f ends with a deadline, corresponding to the refresh rate. The processes and operations occurring in each cycle 204a-f are all completed by the end of the appropriate cycle.

There are three rows showing different functionality, namely processing functionality, rendering functionality, and display functionality, which are performed by different modules. An operation is processed in process row 201. The result of that operation is rendered in render row 202. The frame associated with the operation and result is finally displayed in display row 203.

Illustrating this, first operation 206a begins at process row 201. First operation 206a may access, process, and commit data, which results in an image being rendered for a future cycle. After first operation 206a is completed, result 206b (e.g., the image or other data related to a cell in FIG. 1) is rendered in the subsequent cycle 204b, in render row 202 to obtain a frame 206c. In the next cycle 204c, frame 206c is displayed, as depicted in display row 203.

In cycle 204a, frame 220 is shown in display row 203 being utilized by a computing device for the duration of cycle 204a. In reference to FIG. 1, frame 220 may correspond to cell 101, displaying image 102. Simultaneously, result 205b is being rendered in render row 202. Result 205b may be include images or data corresponding to an unseen portion of cell 101, or simply a reproduction of cell 101 if the user has not initiated a scrolling operation or other input. Data for first operation 206a is being accessed, processed and committed in process row 201. Again in reference to FIG. 1, this can represent the accessing, processing, and committing of the data associated with cell 103 and image 104. Because this process ends before the commit deadline scheduled by the VSync operability of the computing device, the commit deadline has not been missed.

In cycle 204b, the frame 205c is being displayed by the computing device for the duration of cycle 204b, shown in display row 203. Meanwhile, result 206b is shown in render row 202 being rendered for use in cycle 204c. Second operation 207a is now being accessed, processed and committed in process row 201.

In this example, second operation 207a appears much smaller than first operation 206a. In reference to FIG. 1, this might be determining a portion of cell 103 to be displayed in response to a user input such as scrolling. As it is a much smaller operation, requiring less processing power and time, second operation 207a uses much less time in process row 201 than first operation 206a, taking up less time in cycle 204b.

In cycle 204c, frame 206c is shown in display row 203, being displayed by the computing device for the duration of cycle 204c. Result 207b is shown in render row 202 being rendered for display for future cycle 204d. Third operation 208a is shown in process row 201 being accessed, processed, and committed. Like second operation 207a, this operation may be another scrolling operation, resulting in displaying more of cell 103 than previous frames.

In cycle 204d, additional operation 210a is shown in process row 201. Additional operation 210a may access, process, and commit data for an unseen cell or image as in FIG. 1, for example. Additional operation 210a may therefore require more processing power and time than previous operations, as an entire cell and associated images should be processed before it can be rendered and displayed.

Cycles 204e and 204f continue the pattern from above, with operations moving from process row 201 to render row 202 to display row 203 in the order in which they are called for by the computing device. All operations in all rows are scheduled to fit within cycles 204a-f as dictated by the VSync rate and related commit deadlines. In this example, all processes are completed by the deadlines.

II. Occurrence and Reduction of Hitches

If an operation is not completed by the commit deadline set by the VSync operability of the computing device, the data associated with that operation, including a cell or image, cannot be rendered in time for display in the appropriate frame. A user experiences this as a hitch, where at least part of a frame is not displayed as expected. As the refresh rate increases, and data associated with cells or images get larger, the risk of hitches increase as well.

In some instances, a user may experience a hitch because the hardware cannot perform the tasks required in the amount of time remaining before the next commit deadline. In other instances, there may be a hitch due to a cell requiring more processing than is capable of being accomplished before the next commit deadline. These cells may be referred to as expensive cells.

A. Hitches Due to Expensive Cell During Scrolling

Figure 3:
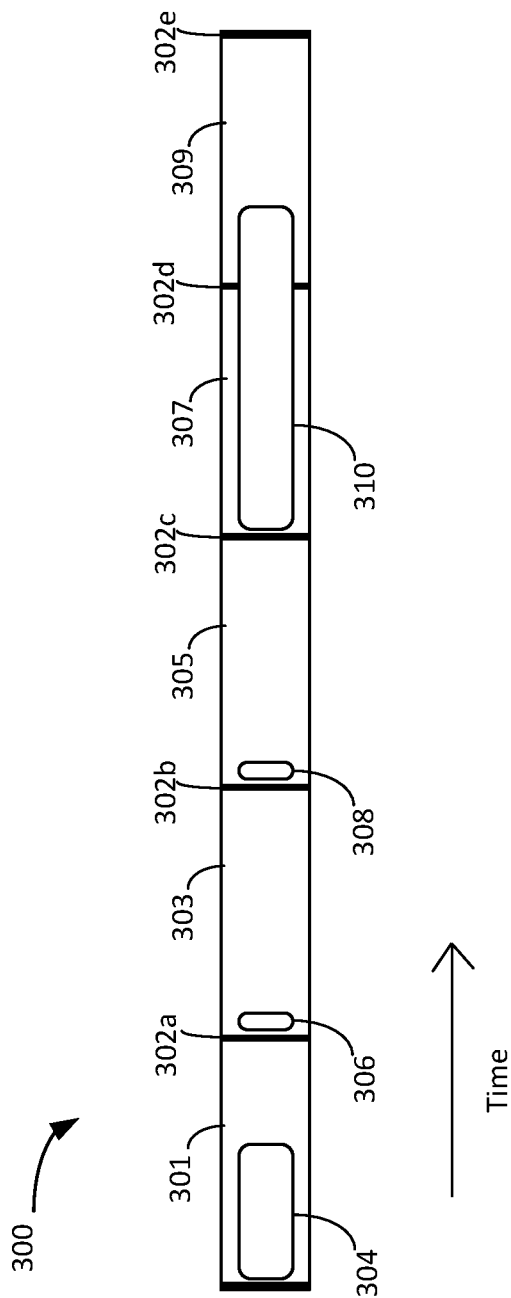
FIG. 3 shows an example of a hitch due to an expensive cell during a scrolling operation.

FIG. 3 shows an example of a hitch due to an expensive cell during a scrolling operation. Sequence 300 shows a series of cycles 301-309 sequentially in time, as in process row 201 in FIG. 2. Processor operations 304-310 are performed sequentially in time for each cycle. The rendering and display of frames is not shown for ease of illustration. Commit deadlines 302a-e are dependent upon VSync, which is shown here to be at regular intervals in time. It should be understood that FIG. 3 is a simplified figure to illustrate the concept of hitches and is not necessarily representative of any particular time scale or interval.

In relation to FIG. 1, initial operation 304 may process data for the entire image 104, and displaying only a seen portion of image 104. First operation 306 can then access and process data for render and display a previously un-displayed portion of image 104 in subsequent cycles. In some embodiments, first operation 306 can be triggered by a user event such as scrolling. Second operation 308 can be similar to first operation 306 in obtaining data for rendering and displaying more previously un-displayed portions of image 104 in subsequent cycles. Second operation 308 can similarly be triggered by a user event such as scrolling.

Again referring to FIG. 1, third operation 310 may access, process, and commit a next cell following cell 103. The next cell may be an expensive cell (e.g., containing a large image or having more associated data), taking more processing power and time to complete and commit to the render module than is available in cycle 307. The processing time associated with third operation 310 therefore extends beyond commit deadline 302d. When this happens, computing device 100 is unable to render the image or portion thereof needed for cycle 309, and the user experiences a hitch in a subsequent cycle.

B. Reducing Hitches by Identifying Periods of Inactivity and Predicting Operations Hitches may be reduced if future operations can be moved to earlier periods of processor inactivity without causing any other scheduled operations to miss their associated commit deadlines. Again referring to FIG. 3, the hitch experienced at cycle 309 can be avoided if the computing device could perform third operation 310 before commit deadline 302d, or any other previous commit deadline, given that the previous operations are completed well before their respective commit deadline 302a-e. Using cycle 303 as an example, operation 306 takes significantly less processing power and time than is available before commit deadline 302b. One or more processors (or portions thereof) may be inactive for a significant portion of cycle 303. Similarly, the processor may be inactive for a significant portion of cycle 305. In this example, the processor of computing device may operate in relatively regular intervals, with periods of high activity followed by periods of relative inactivity.

Embodiments are disclosed that can recognize these periods of relative inactivity. In some embodiments, there may be a recognized cadence to the processing requests made. By way of example, consider FIG. 1 as it pertains to a user scrolling through social media posts. There, a cell containing an image to be rendered may be requested. A user may pause on an image, then scroll to see a next cell, containing a next image. Thus, the processing requests would tend to fall in a sequence of an expensive cell request, as a new cell is accessed, processed, and committed, followed by a series of smaller processing requests as the user scrolls to load unseen portions of a processed cell.

Other embodiments are operable to identify periods of processor inactivity without such a pattern, e.g., the patterns may differ or other factors may be used to provide an accurate prediction. For example, other embodiments can communicate a processor schedule to applications or programs on the computing device, where the processor schedule identifies periods of inactivity with enough time remaining before the next commit deadline to schedule a future operation. These periods of inactivity can be utilized if a suitable future operation can be determined.

C. Determining Future Operations

Applications may be operable to determine future operations. In some embodiments, each application may have one or more prediction engines, capable of determining a likely next operation. In other embodiments, a system routine (e.g., called by an application) can include the prediction engine, which stores or uses historical user interactions (e.g., of last few seconds, minutes, hours, etc.) to predict a next operation by the application. By predicting a likely operation, the computing device or system running on a computing device may be able to schedule processing such that no commit deadlines are missed.

As described above, in reference to FIG. 3, third operation 310 may process a cell following cell 103 in a sequence of cells. The sequence of cells may be a series of social media posts, a scrolling menu, or any other table or collection of cells. Applications may be able to use previous user behavior, preferences, a current frame and an order of images to be displayed, or other information to determine a likely next operation.

Continuing the example from above, a user scrolling through posts on social media may be likely to continue on to a next cell. Based on the time spent browsing, cells in a sequence, or other data, an application may be able to predict a likely next operation. In the case of third operation 310, an expensive cell may be requested. The expensive cell may then be processed ahead of the user request, during periods of processor inactivity as identified above.

Other operations may also be predicted. For example, a user may use a stylus or other implement to mark on a screen. Certain prediction engines may be capable of determining a likely next operation, including an image to be rendered based on a calculated trajectory of previous marks made by the user. Other information including pressure and speed of the stylus, may be used to predict a likely next operation. As above, the likely next operation may be processed before the image or cell needs to be committed, reducing the likelihood of a hitch.

The above examples are in no way limiting, and are merely examples shown for clarity. One of ordinary skill in the art would recognize with the benefit of this disclosure many different operations that might be predicted and/or enable periods of processor inactivity to be identified.

Systems and methods herein related to identifying likely periods of processor inactivity and utilizing the periods of inactivity to schedule predicted operations for use in rendering frames. Embodiments herein can improve display performance by reducing the occurrence of hitches experienced by a user. Embodiments may also provide power savings over current methods by putting a processor in a lower power state if more time is available to perform a particular operation.

III. Architecture for Utilizing Periods of Inactivity.

In order to make use of periods of processor inactivity to render frames, the periods of processor inactivity can first be identified. These periods may also be referred to as idle times. Once an idle time is identified, the amount of idle time before an upcoming commit deadline can be determined. One or more requested operations for use in rendering future frames may then be scheduled to occur during the period of inactivity. What follows is one example of an architecture for identifying and utilizing periods of processor inactivity to render future frames.

Figure 4:
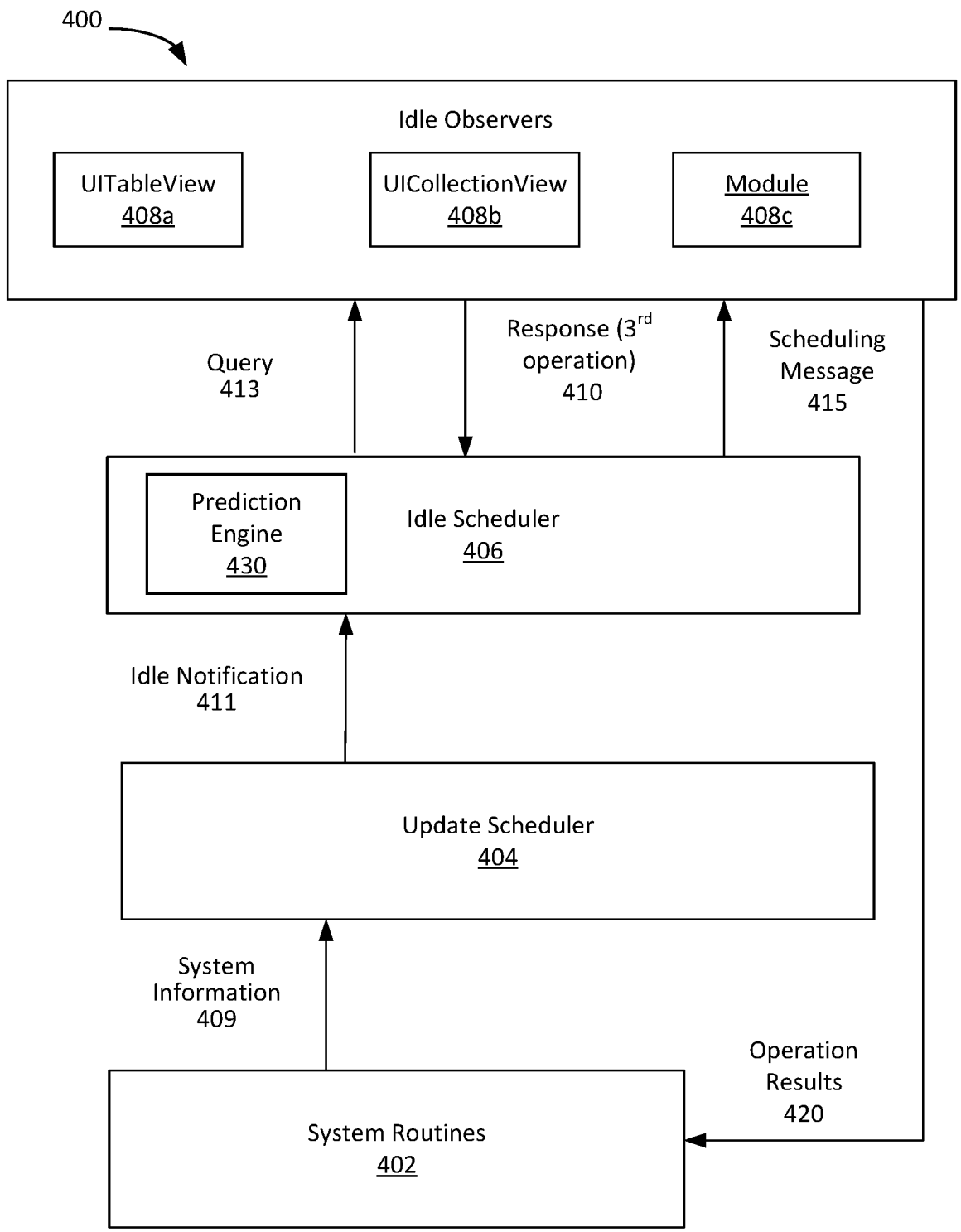
FIG. 4 is a simplified diagram of a software architecture operable to identify periods of processor inactivity and scheduling future operations according to embodiments of the present disclosure.

FIG. 4 is a simplified diagram of a system architecture operable to identify periods of processor inactivity and scheduling future operations to render frames. System architecture 400 includes modules operable to communicate with a processor of the computing device and applications running thereon. The modules may be part of separate software systems on the computing device. System architecture 400 includes an update scheduler 404, an idle scheduler 406, and idle observers 408a-c. These modules can be part of a system framework that applications can call to display content on a user interface of the computer device.

System architecture 400 also includes one or more system routines 402, corresponding to an operating system of the computing device. Various routines (e.g., a render module and the kernel) can be included in system routines 402. The render module can be responsible for receiving the commits from each application process, and then preparing and issuing render commands (e.g., to the GPU), and swapping the framebuffers to cause a new frame to display. System routines 402 may access information about and control one or more processing elements of the computing device and may access system information including current time, processor activity level, power setting, render module scheduling based on refresh rate, VSync, and other hardware or software limitations, and other information about the computing device.

Update scheduler 404 may set commit deadlines and is operable to send commands to system routines 402. Update scheduler 404 may also calculate times remaining to a commit deadline relative to a current time. In some implementations, the update scheduler sets commit deadlines based on a static refresh rate (e.g., a refresh rate of a display). In some implementations, the update scheduler sets commit deadlines based on a variable system refresh rate (e.g., determined by a system component). In some variations, the update scheduler adjusts previously computed commit deadlines based on detected changes in the system refresh rate. For example, in embodiments in which the refresh rate is variable, the refresh rate can be different for each commit deadline, and a refresh rate can change after computing a future commit time; to address such cases, the update scheduler can recompute a commit deadline that was computed before the refresh rate change so that the commit deadline corresponds to the refresh rate of the system that corresponds with the time period between the commit deadline and the previous commit deadline.

Idle scheduler 406 can receive information (e.g., commit deadline information) from update scheduler 404. Idle scheduler also may query and receive data from one or more idle observers 408a-c. Idle scheduler 406 can manage one or more registered observers. For example, idle scheduler 406 can determine when to notify registered observers to do work and determine which ones are notified. Idle scheduler

406 can determine a relative order for notification (e.g., a query or instruction to perform work), where the order can be determined based on various factors including the priority of the work for each observer, a fairness metric that ensures each observer gets a reasonably equal opportunity to do work, and other factors. Idle scheduler 406 can also determine how many observers to notify at any particular point in time and when to stop (e.g., based on the remaining idle time). Idle scheduler 406 can maintain a two-way communication channel with each idle observer (e.g., to tell each idle observer to do work). The idle observers can provide information back to the idle scheduler 406, e.g. information indicating an importance of the work (e.g., to inform priority), information indicating the amount of work to be performed, and information indicating the sizes of each unit of work (e.g., to help idle scheduler 406 determine how to best fit the most amount of work possible in a given amount of time without exceeding the limit).

Prediction engine 430 may predict a likely next operation. While prediction engine 430 is shown as a component of idle scheduler 406, this is just one embodiment. For example, prediction engine 430 may also be included in any or all of idle observers 408*a-c* in addition to or instead of idle scheduler 406. Prediction engine 430 may also be a separate component of system architecture 400.

Prediction engine 430 may be able to predict a likely next operation based on the time spent browsing, cells in a sequence, a current frame and an order of images to be displayed, or other data. Prediction engine 430 may also be capable of determining a likely next operation, including an image to be rendered based on a calculated trajectory of previous marks made by the user. Other information, including pressure and speed of the stylus, may be used to predict a likely next operation.

Idle observers 408*a-c* may include UITableView 408*a*, UICollectionView 408*b*, and Module 408*c*. UITableView 408*a* and UICollectionView 408*b* are examples for types of display that an application might use to display content. Such example displays can involve scrolling. For such an example, these UI elements can display a scrollable list or grid layout of cells, which can optimize for processor and memory performance by only rendering the cells that intersect the visible region at any point in time based on the current scroll position. Module 408*c* can be any other appropriate module for handling display or interactions with a user interface, particularly where the display can be predicted, e.g., as described herein, such as scrolling or writing. Furthermore, although three idle observers 408*a-c* are shown, any number of idle observers may be present.

A. Identification of Processor Inactivity

The computing device can perform a first operation before a first commit deadline, where the result is used to render a first frame and display the first frame in a first cycle of a display connected to the computing device. Idle scheduler 406 may already have a second operation scheduled. The second operation may be in response to a query to idle observers 408*a-c*. Idle scheduler 406 can utilize update scheduler 404 and system routines 402 to cause the computing device to perform the second operation. The result of the second operation can be to render a second frame for a second cycle.

System routines 402 may gather information about the first operations and potentially the second operation (e.g., depending on whether the second operation has been performed yet), as well as other information, and include in system information 409. System routines 402 may send system information 409, including any one or more of current time, processor activity level, processor power setting, render module scheduling based on refresh rate (e.g., VSync), current display refresh rate, current system refresh rate, predicted future display refresh rates, predicted future system refresh rates, and other hardware or software configuration information, as well as other information about the computing device to update scheduler 404. System routines 402 may send system information 409 to update scheduler 404 after every operation is performed, on a periodic schedule, or on a variable schedule.

In some variations, system information 409 can include current processor activity level and current time, which update scheduler 404 can take into account to set commit deadlines. As other examples, system information 409 can include active timers, or other queued pre-scheduled work, which will execute in the near future and which may produce changes that affect the next frame. System information 409 can also include expected input device events that will be delivered (e.g. to know the expected time touch events or stylus events that will be received after processing in firmware). System information 409 can also include a desired refresh rate based on whether there are active animations or other content being displayed, which want a higher refresh rate for smoother motion.

In some implementations, the refresh rate is variable (e.g., a variable system refresh rate determined by a system component, etc.), and the update scheduler identifies a current refresh rate when determining a commit deadline. In a first variation, the update scheduler determines the current refresh rate based on various parameters. In a second variation, the update scheduler identifies the current refresh rate based on information provided by a system component that is constructed to determine the current refresh rate based on various parameters. In some implementations, parameters used to determine a current refresh rate (e.g., by the update scheduler or other system component) include parameters provided by at least one of: a system component, an application, a display device, a display driver, a prediction module, an input device driver, an input device, and the like.

Update scheduler 404 then can set or identify a third commit deadline. In some embodiments, the commit deadlines are evenly spaced in time, e.g., based on a regular VSync rate, which can be determined at least partly by the refresh rate (e.g., a static refresh rate of a display, a variable system refresh rate determined by a system component, etc.). In other embodiments, the VSync rate may be variable, and update scheduler 404 may set variable commit deadlines. Update scheduler 404 can then determine a remaining time to a third commit deadline, relative to the current time. Update scheduler 404 may then send idle notification 411, including the remaining time and optionally a first processor power setting to idle scheduler 406.

Upon receiving the remaining time from update scheduler 404, idle scheduler 406 may send query 413 to idle observers 408*a-c* for information associated with one or more future operations to be performed in future cycles (e.g., a third operation in a third cycle or an additional operation in a fourth or later cycle). In some embodiments, idle scheduler 406 may send query to each of idle observers 408*a-c* according to a specified order. The order in which idle observers 408*a-c* are notified can be dynamic, and idle scheduler 406 can use information at its disposal to choose which observer to notify next and also control whether just one or multiple idle observers get notified within a single idle time.

B. Utilization of Processor Inactivity for Predicted Operations

In certain embodiments, idle scheduler 406 may predict the third operation using prediction engine 430. Prediction engine 430 may predict a likely operation based on previous user behavior, preferences, a current frame and an order of images to be displayed, or other information to determine a likely operation. In this embodiment, query 413 may include a request for information associated with the likely operation. Any or all of idle observers 408a-c may have information associated with the likely operation.

In some implementations, when idle observers initially register themselves with idle scheduler 406, they can provide information up front about how important they are (e.g. the main scrollable content may have a higher priority than a smaller auxiliary view on the side). Idle scheduler 406 may directly query each observer to provide details about the work the idle observer would like to perform, or collect information about each idle observer (e.g., whether the idle observer is currently displaying UI that is visible or not), before idle scheduler 406 notifies one or more idle observers to actually perform work. In addition, each idle observer may return information about how much additional work remains and/or other information to idle scheduler 406 when the idle observer completes its work.

Idle observers 408a-c may also have information about a requested operation to be performed, in addition to or instead of the likely third operation. Any or all of idle observers 408a-c may have information about one or more requested operations. The information about the each of the requested operations can include processing time for the requested third operation and instructions that can cause the computing device to process and render a third frame for a third cycle.

Additionally, the requested third operation may be predicted by one or more of idle observers 408a-c. One or more idle observer 408a-c may include a prediction engine, similar to prediction engine 430, capable of predicting a third operation based on previous user behavior, preferences, or other information to determine a likely third operation.

One or more of idle observers 408a-c can send response 410 with information concerning the third operation and any other likely operation for future cycles to idle scheduler 406. Response 410 can include data to be rendered, information about processing times, and other relevant data for the third operation for any future operations, including which cycle the future operations is likely to occur. Idle scheduler 406 may then compare each of the processing times corresponding to the operations to the remaining time. Idle scheduler 406 may then select a third operation from the one or more requested operations wherein the likelihood of the operation is above a threshold. Idle scheduler 406 may then schedule a third operation to be performed before the third commit deadline, e.g., via scheduling message 415.

In addition to selecting the third operation to be performed before the third commit deadline, an additional operation needed for cycles after the third cycle may be predicted utilizing prediction engine 430. In some embodiments, the additional operation may be a prefetch operation, where a frame can be accessed, processed and rendered before the user requests it from the computing device. Referring to FIG. 3, the additional operation may be an expensive cell. By prefetching an expensive cell such as occurs for third operation 310, idle scheduler 406 may schedule the expensive cell to be processed during a period of processor inactivity.

After selecting a third operation and predicting an additional operation, idle scheduler 406 may then determine a total processing time of the third operation and the additional operation, and compare the total processing time to the remaining time.

Upon determining that the total processing time (i.e., for the third operation and the additional operation) is less than the time remaining to the third commit deadline, idle scheduler 406 may provide a scheduling message 415, including information about the third operation and the additional operation, to a particular idle observer. After performing the operations, the idle observer may then send an operation result 420 (e.g., prefetched data) to system routines 402. System routines 402 can then use operation result 420 submitted before the third commit deadline. The result of the third operation can be used for rendering a third frame to be displayed in a third cycle. The additional result of the additional operation can be used to render an additional frame for a future cycle before a future render deadline.

C. Power Saving Mode

Figure 5:
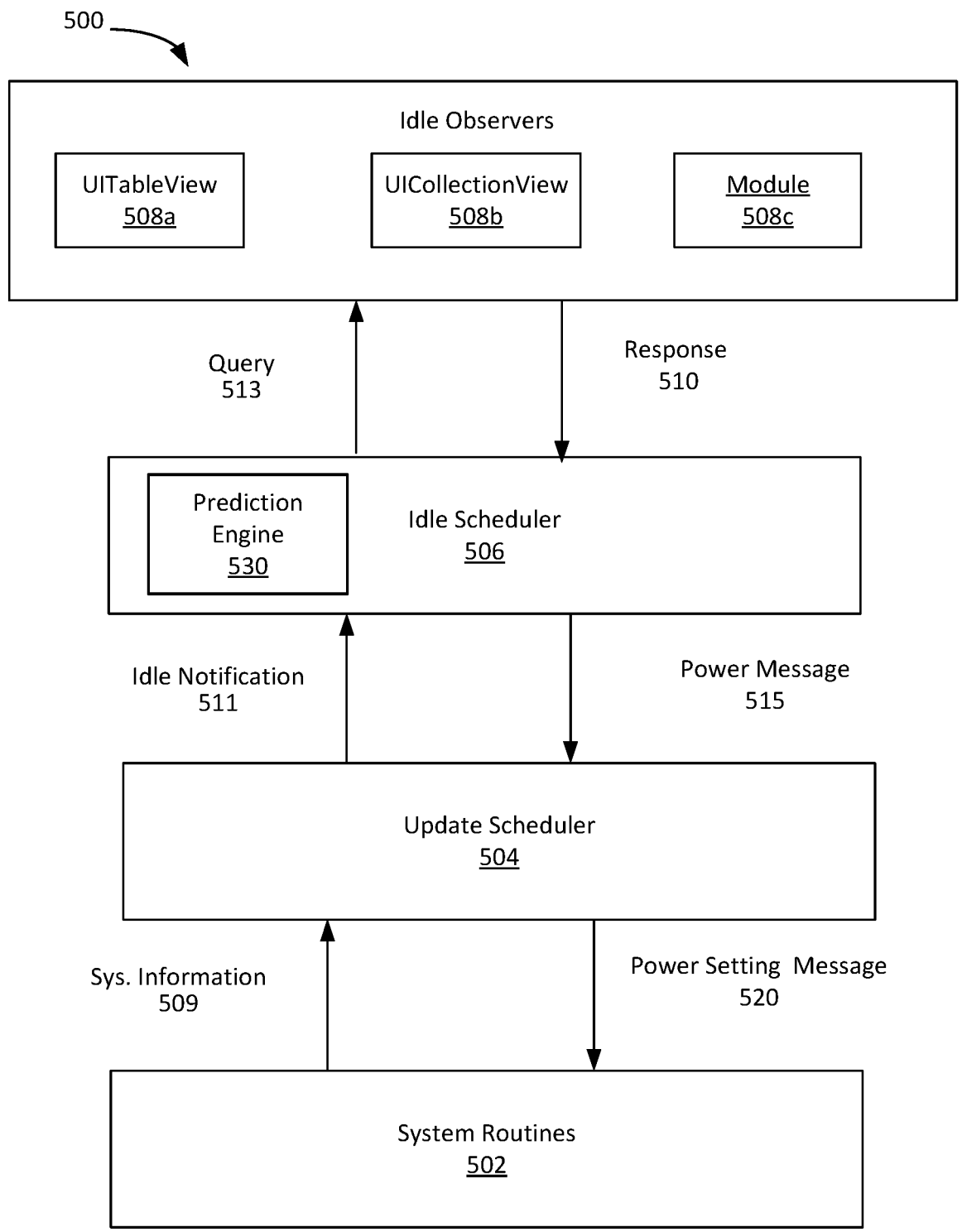
FIG. 5 is a simplified diagram of a software architecture identifying a period of inactivity and processing a second operation at a lower power setting according to embodiments of the present disclosure.

FIG. 5 is a simplified diagram of a system architecture identifying a period of inactivity and processing an operation at a lower power setting. The components incorporated in system architecture 500 are the same as those described in FIG. 4, but achieve a different purpose. Each components functionality and features are the same as listed above in reference to FIG. 4.

System routine(s) 502 may send system information 509 including current time, processor activity level, processor power setting, render module scheduling based on refresh rate, VSync, and other hardware or software limitations, and other information about the computing device to update scheduler 504. In some implementations, system information 509 includes a current refresh rate (e.g., a static refresh rate of a display, a variable system refresh rate determined by a system component, etc.). Using system information 509, update scheduler 504 may set a second commit deadline. Update scheduler 504 can then determine a remaining time to the second commit deadline, relative to the current time, and send idle notification 511 including some or all of the system information 509, and the remaining time to idle scheduler 506.

In response to receiving the remaining, idle scheduler 506 sends query 513 to idle observers 508a-c for information associated with a requested second operation. In some embodiments, idle scheduler 506 may send query 513 to each of idle observers 508a-c according to a predetermined order, or may query all idle observers 508a-c simultaneously.

Idle observers 508a-c may access information about a requested next operation to be performed. Any or all of idle observers 508a-c may have information about one or more requested second operations. The information about the each of the requested next operations can include processing time for the requested second operation, a processor power setting, and instructions that can cause the computing device to process and render a second image for a second frame. In certain embodiments, each requested next operation may be a pre-determined update to an unperformed operation.

One or more of idle observers 508a-c can send request signal 510, including information about the one more next operations to idle scheduler 506. Idle scheduler 506 may then compare each of the processing times corresponding to the one or more requested next operations to the remaining time. Idle scheduler 506 may then determine a second operation to be performed before the second commit deadline In some implementations, if the second operation is a smaller operation (e.g., not an expensive cell as shown in FIG. 3), and the idle scheduler 506 determines that an additional operation cannot be performed with the remaining time, idle scheduler 506 may determine that the second operation can be completed within the remaining time using a lower power setting. In other implementations, it can be determined that additional operations will not cause a hitch in a future cycle (e.g. because an additional operation can be performed within the allotted time for that cycle). Thus, a lower power setting can be selected for the second operation since no additional operations need to be performed. Idle scheduler 506 may determine a completion time of the second operation at the first power setting and compare it to the remaining time, to confirm that the lower power setting is suitable. Accordingly, Idle Scheduler 506 may access information about the power setting associated with the second operation, and determine that the second operation may be performed by the processor at a second processor power setting that is lower than a first power setting.

After determining that the second power setting is lower than the first power setting, idle scheduler 506 may send power message 515, including the information about the second operation, to update scheduler 504. Update scheduler 504 may then send power setting message 520 to system routines 502. System routines 502 can then cause one or more processor elements of the computing device to enter a lower power setting. The computing device may then perform the second operation at the lower power setting, where the result of the second operation is used to render a second frame for a second cycle.

In other embodiments, the processor power state can be managed via a performance controller (e.g., a "closed loop" feedback controller). The controller can monitor overall CPU utilization and the rate at which frames are being produced. The controller can also receive information about when work (including commits) are happening (e.g., from update scheduler 504) and about whether frame deadlines are being missed. Based on this information, the performance controller can adjust up or down the power state as needed (e.g., slowly so that changes are not large from one cycle to another). The controller can have a goal to keep the power state as low as possible, while ensuring that it still provides enough performance to complete tasks in a timely fashion and ensure frame deadlines are being met. By virtue of the idle scheduler intelligently scheduling work in a way that allows more time to finish before the deadline (better utilizing what would otherwise be pure idle downtime, and thus smoothing out the workload with less peaks), the controller can reduce the processor power state, without having idle scheduler 506 or update scheduler 504 explicitly ask for the power state to be reduced.

IV. Hitch Reduction by Performing Additional Operations

The modules in FIG. 4 above can reduce the occurrence of hitches through performing additional operation for the rendering of future frames. Accordingly, embodiments can optimize operations cycles (such as the one shown in FIG. 2) by scheduling large operations, such as processing data and images associated with expensive cells during a period of processor inactivity. As discussed above, scheduling and processing of large operations may be done such that no commit deadlines are missed. What follows is a simplified example of an operations cycle with an expensive cell in a typical processing schedule and a processing schedule where additional operations are scheduled during periods of processor inactivity as disclosed in certain embodiments.

A. Hitch Caused by Expensive Cell

FIG. 6A is a simplified diagram of an operations cycle with an expensive cell running according to a typical processing schedule. Block 600 shows a cycle of operations, similar to that of FIG. 2, occurring within cycles 604a-f. Processes move through the operations cycle identically to that described in FIG. 2, but a hitch occurs due to an expensive cell.

There are three rows showing different functionality, namely processing functionality, rendering functionality, and display functionality, which are performed by different modules. An operation is processed in process row 601. The result of that operation is rendered in render row 602. The frame associated with the operation and result is finally displayed in display row 603.

In cycle 604a, frame 620 is shown in display row 403 being displayed by a computing device for the duration of cycle 604a. In reference to FIG. 1, frame 620 may correspond to cell 101 displaying image 102. Simultaneously, result 605b is being rendered in render row 602. Result 605b may be an unseen portion of cell 101, or simply a reproduction of cell 101 if the user has not initiated a scrolling operation or other input. First operation 606a may access, process, and commit data for a future frame in process row 601. Again in reference to FIG. 1, this can represent the accessing, processing, and committing of the data associated with cell 103 and image 104. Because this process ends before the commit deadline scheduled by the VSync operability of the computing device, the commit deadline has not been missed.

In cycle 604b, frame 605c is being displayed by the computing device for the duration of cycle 604b, shown in display row 603. Meanwhile, result 606b is shown in render row 602 being rendered for use in cycle 604c. Second operation 607a may access, process, and commit data for a future frame in processing row 601.

In this example, second operation 607a appears much smaller than first operation 606a. In reference to FIG. 1, this might be determining a portion of cell 103 to be displayed in response to a user input such as scrolling. As it is a much smaller operation, requiring less processing power and time, second operation 607a uses much less time in process row 601 than first operation 606a, taking up less time in cycle 604b.

In cycle 604c, frame 606c is shown in display row 603, being displayed by the computing device for the duration of cycle 604c. Result 607b is shown in rendering row 602 being rendered for display for future cycle 604d. Third operation 608a is shown in processing row 601, and may access, process and commit data for a future frame. Like second operation 607a, this operation may be another scrolling operation, resulting in displaying more of cell 103 than previous frames.

In cycle 604d of FIG. 6A, additional operation 610a may access, process, and commit data for a future frame in processing row 601. Additional operation 610a may take longer to complete than scheduling based on VSync alone would allow. In cycle 604d, all functions are not completed before commit deadline 640d. In cycles 604d and 604e, processing additional operation 610a extends beyond commit deadline 640d, and the user experiences a hitch in cycle 604f. Because periods of processor inactivity can be identified, however, processing additional operation 610 may occur in an earlier frame.

B. Identifying Periods of Processor Inactivity

Process row 601 shows data being accessed, processed and committed (also referred to as "processing") during the duration of a cycle 604a-f. Operations in processing row 601 may be performed by a processor, having one or more processing elements. Blank portions of cycles 604a-f may represent periods of processor inactivity.

Thus, process row 601 can be used to identify periods of processor inactivity, for example by system architecture 400. Using FIG. 1 as a reference, second operation 607a can be to access, process and commit an image for a cell not yet displayed. As represented in cycle 604a, processing first operation 606a is a relatively large operation, utilizing significant processor resources.

In cycle 604b, second operation 607a is shown being accessed, processed, and committed in processing row 601. Again using FIG. 1 as a reference, this could be scrolling to a previously unseen portion of an image. Compared with first operation 606a, second operation 607a is relatively small. The processor therefore may be in a period of inactivity for a relatively large portion of cycle 604b. Similarly, third operation 608a is a relatively small operation, also having a period of processor inactivity.

In some embodiments, a system such as the one described in FIG. 4 can identify the periods of processor inactivity in cycles 604b and 604c. The system may identify likely periods of inactivity based on a processor cadence. An example of this processor cadence may be a large operation followed by a series of smaller operations (e.g. operation 606a, 607a, and 608a, sequentially). The system may also identify a period pf processor inactivity within an instant cycle, such as after processing second operation 607a in cycle 604b. Upon identifying periods of processor inactivity, a system such as system architecture 400 may schedule and perform an additional operation such as operation 610a.

C. Performing an Additional Operation

FIG. 6B is a simplified diagram of an operations cycle performing an additional operation for an expensive cell. Block 600 represents the same operations cycle as FIG. 6A, but using a system such as system architecture 400 to predict and perform a future operation. By performing additional operation 610a in a period of processor inactivity, hitches may be avoided.

Referring back to FIG. 4, update scheduler 404 can recognize a period of processor inactivity in cycle 604b after accessing and processing data associated with second operation 607a. This inactivity may be identified by a pattern or cadence, or may be communicated by the computing device immediately after processing second operation 607a. Update scheduler 404 can then calculate a remaining time to a third commit deadline 640c at the end of cycle 604c, relative to a current time. Update scheduler 404 can send the remaining time to idle scheduler 406 in system information 409. Idle scheduler 406 can then send query 413 to idle observers 408a-c for requested next operations.

One or more idle observers 408a-c can send one or more requested next operations to idle scheduler 406, wherein one or more of the requested next operations may be predicted by one or more prediction engines such as prediction engine 430. Idle scheduler 406 can then calculate a total processing time from the processing time of one or more of the next operations and the processing time of third operation 608a. After determining that the total processing time is less than the time remaining, idle scheduler 406 may select additional operation 610a from the one or more requested next operations. Idle scheduler 406 may select additional operation 610a based solely on processing time, or operation 610a may be predicted by a prediction engine (prediction engine 430) where the likelihood of operation 610a is above a certain threshold. In other embodiments, idle scheduler 406 may select additional operation 610a according to a predetermined schedule.

Idle scheduler 406 may then send scheduling message 415 containing information about additional operation 610a to the corresponding idle observer. As seen in FIG. 6B, in relation to FIG. 4, the idle observer can send an operation result to system routines 402. The idle observer can access, process, and commit additional operation 610a in cycle 604b (or at least a majority of additional operation 610a, e.g., 60%, 79%, 80%, 90%, 95%, or 99%) after completing second operation 607a. As shown in FIG. 6B, a small remaining portion of additional operation 610A can be performed in cycle 604d. Because additional operation 610a has been processed before its commit deadline, the result 610b can be rendered and frame 610c can be displayed in cycle 604f without a hitch occurring. Accordingly, idle scheduler 406 can cause the computing device to access, process, and commit data associated with third operation 608a in cycle 604c before third commit deadline 640c.

After processing data associated with additional operation 610a in cycle 604b, the computing device may cache the processed data associated with operation 610a instead of providing result 610b directly to a render module. Result 610b may not be provided to the render module until some cycle after 604e, and frame 610c not displayed until some cycle after 604f. In other words, operation 610a may be performed well in advance of when it is needed, not limited to a particular cycle.

V. Performing Future Operations Using Idle Time

Figure 7:
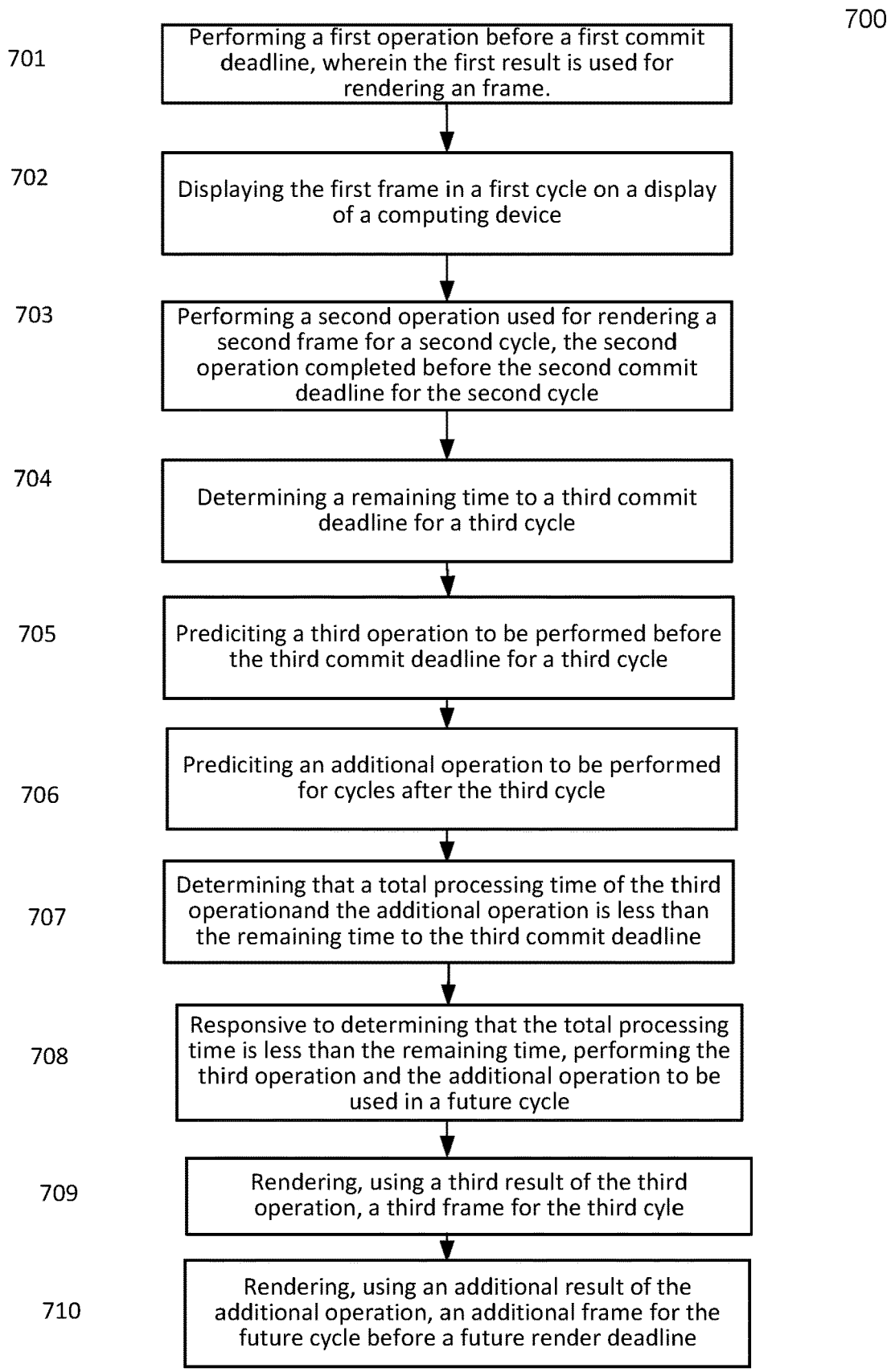
FIG. 7 is a flowchart illustrating an exemplary process for operating a computing device in order to perform future operations for rendering frames according to embodiments of the present disclosure.

FIG. 7 is a flowchart illustrating an exemplary process for operating a computing device in order to perform future operations for rendering frames. It will be appreciated that the operations described in process 700 can be performed in any order and/or one or more of the operation may not be performed. In some implementations, process 700 can be performed by a system on a computing device such as the systems described in FIG. 4.

At block 701, a first operation is performed before a first commit deadline. The first result can be used for rendering a first frame. In certain embodiments, the computing device can be similar to the one shown in FIG. 1 can perform process 700.

At block 702, the first frame is displayed in a first cycle on the display of the computing device. In certain embodiments, the first frame may include part of a first cell displayed in a series of web content. The first frame also may include parts generated in response to a user input, such as a mark made with a stylus or other implement on a screen.

At block 703, a second operation is performed having a second result used for rendering a second frame for a second cycle, the second operation completed before a second commit deadline for the second cycle. In certain embodiments, the second frame may be the next image in a series of web content, e.g., as part of scrolling. In another example, the second frame may also include generated in response to a user input, such as a mark made with a stylus or other implement on a screen.

At block 704, a remaining time to a third commit deadline is determined relative to a current time. The third commit deadline can be set by update scheduler 404. Update scheduler 404 can use a regular VSync based on the refresh rate (e.g., a static refresh rate of a display, a variable system refresh rate determined by a system component, etc.), or it may set a variable VSync. Accordingly, the first commit deadline, the second commit deadline, and the third commit deadline can be determined based on a refresh rate (e.g., a static refresh rate of a display, a variable system refresh rate determined by a system component, etc.). Alternatively, the first commit deadline, the second commit deadline, and the third commit deadline can have a variable periodicity. The current time may be determined by the computing device. In certain embodiments, this may be performed by a system such as the one in FIG. 4. The remaining time may be determined by update scheduler 404.

At block 705, a third operation is predicted, to be performed before the third commit deadline for a third frame. In some embodiments, the third operation may be predicted by one of a plurality of prediction engines. The plurality of prediction engines may similar to prediction engine 430 in FIG. 400. The plurality of prediction engines may be included in idle scheduler 406 or any other component of system architecture 400. The prediction engines may be capable of determining a likely next operation, including a frame to be rendered based on a calculated trajectory of previous marks made by the user. Other information including pressure and speed of the stylus, may be used to predict a likely next operation. As above, the likely next operation may be processed before the data needs to be committed, reducing the likelihood of a hitch.

The prediction engines may also be capable of predicting a next cell to be displayed. These prediction engines may use user data, preferences, time spent browsing, cells in a sequence, or other appropriate data to determine a likely next operation. One of ordinary skill in the art with the benefit of this disclosure would recognize many variable and alternatives.

At block 706, an additional operation is predicted, to be performed for cycles after the third cycle. In some embodiments, the additional operation may be predicted by one of a plurality of prediction engines. The plurality of prediction engines may be included in a system such as system architecture 400. The plurality of prediction engines may be similar to prediction engine 430, included in idle scheduler 406 or any other component of system architecture 400. The prediction engines may be capable of determining a likely next operation, including an image to be rendered based on a calculated trajectory of previous marks made by the user. Other information including pressure and speed of the stylus, may be used to predict a likely next operation. In certain embodiments, the additional operation may be selected from among a plurality of operations that have a likelihood of future operation that is above a threshold. As above, the likely next operation may be processed before the image or cell needs to be committed, reducing the likelihood of a hitch. Accordingly, the third operation and the additional operation can be predicted using a prediction engine that predicts operations based on a current frame and an order of images to be displayed by an application.

The second operation can be responsive to a scrolling operation at a user interface of the computing device. The scrolling operation may not cause a portion of a new image to be displayed on the display of the computing device, e.g., like second operation 607a in FIGS. 6A and 6B. In contrast, the additional operation can result in at least a portion of a new image to be displayed.

At block 707, a total processing time of the third operation and the additional operation is determined to be less than the remaining time to the third commit deadline. In some embodiments, this may be done by a system such as the one in FIG. 4. The total processing time may be done by idle scheduler 406. Idle scheduler 406 may then determine that the total processing time is less than the remaining time.

At block 708, in response determining that the total processing time is less than the remaining time, the third operation is performed. The additional operation to be used in a future cycle is also performed. In some embodiments this may be done by a system such the one in FIG. 4. Idle scheduler 406 may send a signal to update scheduler 404 scheduling the additional operation. Update scheduler 404 can then send a signal to system routines 402 that may cause the computing device to perform the additional operation. In some embodiments, the additional operation may be a prefetch operation.

At block 709, a third frame for a third cycle is rendered using a third result of the third operation. In certain embodiments, the third frame may include part of a next cell to be displayed in a series of web content. The third frame may also include an expected response to a user input, such as a mark made with a stylus or other implement on a screen.

At block 710, an additional frame is rendered, using an additional result of the additional operation for the future cycle before a future render deadline for the additional frame. In certain embodiments, the additional frame may include part of a next cell to be displayed in a series of web content. The additional frame may also include an expected response to a user input, such as a mark made with a stylus or other implement on a screen.

In certain embodiments of process 700, the first, second, and third commit deadlines are set by update scheduler 404. In some embodiments, the commit deadlines are determined by the refresh rate (e.g., a static refresh rate of a display, a variable system refresh rate determined by a system component, etc.). In other embodiments, the commit deadlines may have a variable periodicity.

Although FIG. 7 shows example steps of process 700, in some embodiments, process 700 can include additional steps, fewer steps, different steps, or differently arranged steps than those depicted in FIG. 7. Additionally, or alternatively, two or more of the steps of process 700 can be performed in parallel.

VI. Flow for Utilizing a Lower Processor Power Setting

Figure 8:
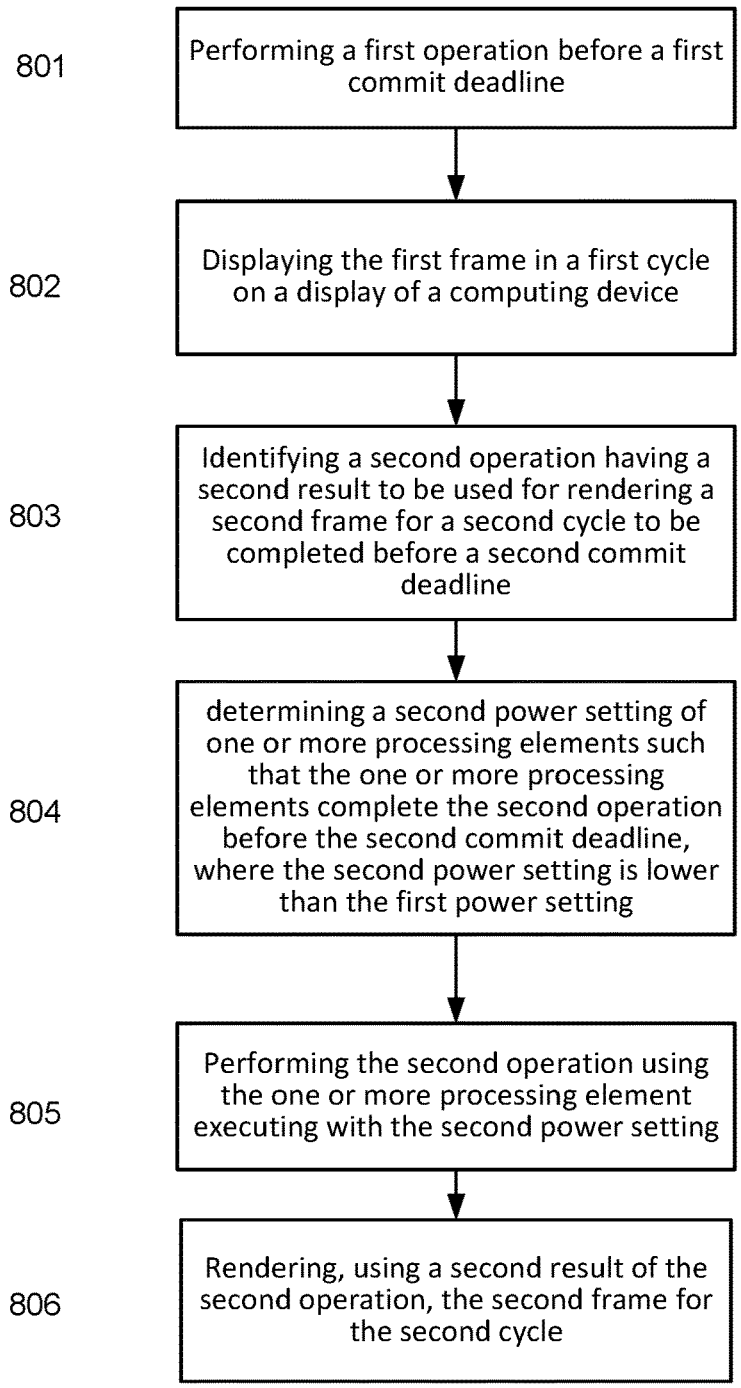
FIG. 8 is a flowchart illustrating an exemplary process for operating a computing device in order to process an operation at a lower power setting according to embodiments of the present disclosure.

FIG. 8 is a flowchart illustrating an exemplary process for operating a computing device in order to process an operation at a lower power setting. It will be appreciated that the operations described in process 800 can be performed in any order and/or one or more of the operation may not be performed. Aspects of process 800 can be performed in a similar manner as process 700. In some implementations, process 800 can be performed by a system on a computing device such as the system architecture described in FIG. 5.

At block 801, a first operation is performed before a first commit deadline, wherein a first result of the first operations is used for rendering a first frame, wherein the first operation is implemented using one or more processing elements using a first power setting. In some embodiments, the computing device performing the first operation may be similar to the one shown in FIG. 1.

At block 802, the first frame is displayed in a first cycle on the display of the computing device. In certain embodiments, the first frame may include part of a cell in a series of web content. The first frame also include an expected response to a user input, such as a mark made with a stylus or other implement on a screen.

At block 803, a second operation is identified, having a second result to be used for rendering a second frame for a second cycle, the second operation to be completed before a second commit deadline for the second cycle. In certain embodiments, this may be performed by one or more components of a system such as the one in FIG. 5.

At block 804, a second power setting of one or more processing elements is determined such that the one or more processing elements complete the second operation before the second commit deadline, wherein the second power setting is lower than the first power setting.

In certain embodiments, this may be performed by one or more components of a system such as the one in FIG. 5. For example, update scheduler 504 can send information about the first power setting to idle scheduler 506. Idle scheduler 506 can identify a second operation. In some embodiments, the second operation can be received by idle scheduler 506 from one or more of idle observers 508*a-c*. The second operation may also be predicted, for example by prediction engine 530. Idle scheduler 506 can then determine that the second power setting wherein the second power setting is lower than the first power setting.

In some embodiments, determining the second power setting can include determining a remaining time to the second commit deadline relative to a current time, determining a completion time using the first power setting, and comparing the completion time to the remaining time to determine the second power setting. If the completion time is much less than the remaining time, then the power setting can be reduced. The amount of reduction can depend on how much less the completion time is than the remaining time. In some implementations, a new completion time of another power setting can be estimated, and compares to the remaining time, as part of determining an optimal power setting to use as the second power setting.

In certain embodiments, the second power setting may be determined by one or more components of a system such as the one in FIG. 5. For example, idle scheduler 506 and/or update scheduler 504 can make the determination. Accordingly, determining the second power setting can be performed by a scheduler that interfaces with a user interface routine (e.g., one or more of the idle observers), and the scheduler can instruct the one or more processing elements to use the second power setting. The scheduler can estimate that a completion time using the second power setting to be less than the remaining time, so that the second power setting is known to be acceptable for meeting the second commit deadline.

In other embodiments, determining the second power setting can be performed by a performance controller that receives information about commit deadlines and adjusts a power setting of the one or more processing elements, e.g., as described herein.

At block 805, the second operation is performed using the one or more processing element executing with the second power setting. In certain embodiments, this may be performed by one or more components of a system such as the one in FIG. 5.

At block 806, the second frame for the second cycle is rendered using a second result of the second operation. In certain embodiments, the second frame may include part of a cell in a series of web content. The second frame may also include an expected response to a user input, such as a mark made with a stylus or other implement on a screen.

The images described in relation to process 800 are done only by way of example. One of ordinary skill in the art would recognize many variations, modifications and alternatives beyond images in a sequence of images or marks made or expected to be made by a stylus or other implement on a screen.

Although FIG. 8 shows example steps of process 800, in some embodiments, process 800 can include additional steps, fewer steps, different steps, or differently arranged steps than those depicted in FIG. 8. Additionally, or alternatively, two or more of the steps of process 800 can be performed in parallel.

VII. Example of Mobile Device

Figure 9:
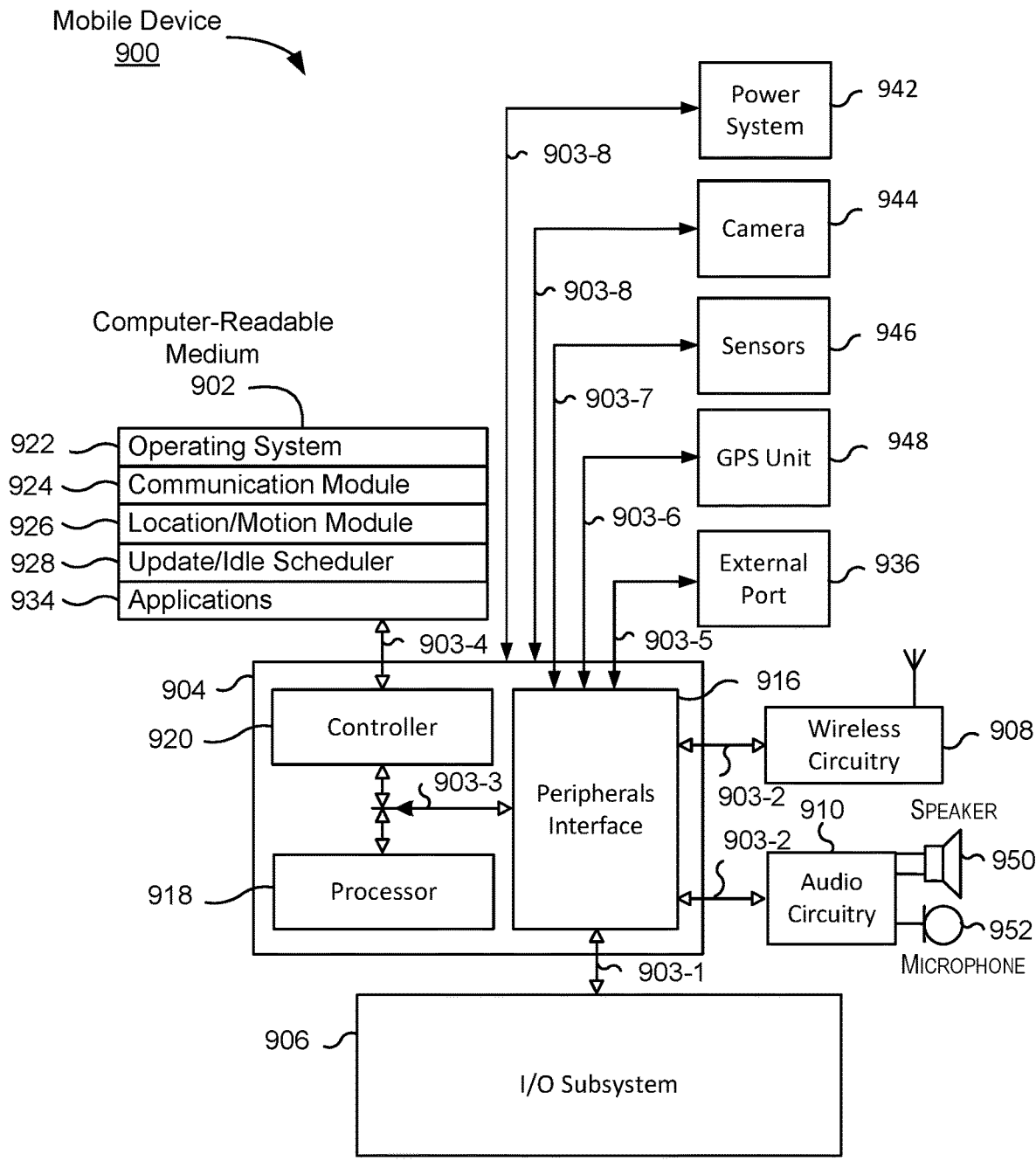
FIG. 9 is a block diagram of an example electronic device.

FIG. 9 is a block diagram of an example mobile device 900. The mobile device 900 can include a smartphone, a wearable device (e.g., a smartwatch, smart glasses), a tablet computer, a laptop computer, or a desktop computer. The mobile device 900 generally includes computer-readable medium 902, control circuitry 904, an Input/Output (I/O) subsystem 906, wireless circuitry 908, and audio circuitry 910 including speaker 950 and microphone 952. These components may be coupled by one or more communication buses or signal lines 903. Mobile device 900 can be any portable electronic device, including a handheld computer, a tablet computer, a mobile phone, laptop computer, tablet device, media player, personal digital assistant (PDA), a key fob, a car key, an access card, a multifunction device, a mobile phone, a portable gaming device, a headset, or the like, including a combination of two or more of these items.

It should be apparent that the architecture shown in FIG. 9 is only one example of an architecture for mobile device 900, and that mobile device 900 can have more or fewer components than shown, or a different configuration of components. The various components shown in FIG. 9 can be implemented in hardware, software, or a combination of both hardware and software, including one or more signal processing and/or application specific integrated circuits.

Wireless circuitry 908 is used to send and receive information over a wireless link or network to one or more other devices' conventional circuitry such as an antenna system, a radio frequency (RF) transceiver, one or more amplifiers, a tuner, one or more oscillators, a digital signal processor, a CODEC chipset, memory, etc. Wireless circuitry 908 can use various protocols, e.g., as described herein. In various embodiments, wireless circuitry 908 is capable of establishing and maintaining communications with other devices using one or more communication protocols, including time division multiple access (TDMA), code division multiple access (CDMA), global system for mobile communications (GSM), Enhanced Data GSM Environment (EDGE), wideband code division multiple access (W-CDMA), Long Term Evolution (LTE), Long-term Evolution (LTE)-Advanced, Wi-Fi (such as Institute of Electrical and Electronics Engineers (IEEE) 802.11a, IEEE 802.11b, IEEE 802.11g and/or IEEE 802.11n), Bluetooth, Wi-MAX, voice over Internet Protocol (VoIP), near field communication protocol (NFC), a protocol for email, instant messaging, and/or a short message service (SMS), or any other suitable communication protocol, including communication protocols not yet developed as of the filing date of this document.

Wireless circuitry 908 is coupled to control circuitry 904 via peripherals interface 916. Peripherals interface 916 can include conventional components for establishing and maintaining communication between peripherals and. Voice and data information received by wireless circuitry 908 (e.g., in speech recognition or voice command applications) is sent to one or more processors 918 via peripherals interface 916. One or more processors 918 are configurable to process various data formats for one or more application programs 934 stored on computer-readable medium 902.

Peripherals interface 916 couple the input and output peripherals of mobile device 900 to the one or more processors 918 and computer-readable medium 902. One or more processors 918 communicate with computer-readable medium 902 via a controller 920. Computer-readable medium 902 can be any device or medium that can store code and/or data for use by one or more processors 918. Computer-readable medium 902 can include a memory hierarchy, including cache, main memory, and secondary memory. The memory hierarchy can be implemented using any combination of RAM (e.g., Standard Random Access Memory (SRAM), Dynamic Random Access Memory (DRAM), Double Data Random Access Memory (DDRAM), Read only Memory (ROM), FLASH, magnetic and/or optical storage devices, such as disk drives, magnetic tape, CDs (compact disks) and DVDs (digital video discs). In some embodiments, peripherals interface 916, one or more processors 918, and controller 920 can be implemented on a single chip, such as control circuitry 904. In some other embodiments, they can be implemented on separate chips.

Processors 918 can include hardware and/or software elements that perform one or more processing functions, such as mathematical operations, logical operations, data manipulation operations, data transfer operations, controlling the reception of user input, controlling output of information to users, or the like. Processors 918 can be embodied as one or more hardware processors, microprocessors, microcontrollers; field programmable gate arrays (FPGAs), application-specified integrated circuits (ASICs), or the like.

Mobile device 900 may include storage and processing circuitry such as control circuitry 904. Control circuitry 904 may include storage such as hard disk drive storage, non-volatile memory (e.g., flash memory or other electrically-programmable-read-only memory configured to form a solid-state drive), volatile memory (e.g., static or dynamic random-access-memory), etc. Processing circuitry in control circuitry 904 may be used to control the operation of mobile device 900. This processing circuitry may be based on one or more microprocessors, microcontrollers, digital signal processors, baseband processor integrated circuits, application specific integrated circuits, etc.

Control circuitry 904 may be used to run software on mobile device 900, such as internet browsing applications, voice-over-internet-protocol (VOIP) telephone call applications, email applications, media playback applications, operating system functions, etc. To support interactions with external equipment, control circuitry 904 may be used in implementing communications protocols. Communications protocols that may be implemented using control circuitry 904 include internet protocols, wireless local area network protocols (e.g., IEEE 802.11 protocols—sometimes referred to as Wi-Fi®), protocols for other short-range wireless communications links such as the Bluetooth® protocol, cellular telephone protocols, multiple-input and multiple-output (MIMO) protocols, antenna diversity protocols, satellite navigation system protocols, millimeter wave communications protocols, IEEE 802.15.4 ultra-wideband communications protocols, etc.

Mobile device 900 may include I/O subsystems 906. I/O subsystems 906 may include input-output devices. Input-output devices may be used to allow data to be supplied to mobile device 900 and to allow data to be provided from mobile device 900 to external devices. Input-output devices may include user interface devices, data port devices, and other input-output components. For example, input-output devices may include one or more displays (e.g., touch screens or displays without touch sensor capabilities), one or more image sensors 944 (e.g., digital image sensors), motion sensors, and speakers 950. Input-output device may also include buttons, joysticks, scrolling wheels, touch pads, key pads, keyboards, microphones 952, haptic elements such as vibrators and actuators, status indicators, light sources, audio jacks and other audio port components, digital data port devices, light sensors, capacitance sensors, proximity sensors (e.g., a capacitive proximity sensor and/or an infrared proximity sensor), magnetic sensors, and other sensors and input-output components.

Mobile device 900 also includes a power system 942 for powering the various hardware components. Power system 942 can include a power management system, one or more power sources (e.g., battery, alternating current (AC)), a recharging system, a power failure detection circuit, a power converter or inverter, a power status indicator (e.g., a light emitting diode (LED)) and any other components typically associated with the generation, management and distribution of power in mobile devices.

In some embodiments, mobile device 900 includes an image sensor 944 (e.g., a camera). In some embodiments, mobile device 900 includes sensors 946. Sensors can include accelerometers, compass, gyrometer, pressure sensors, audio sensors, light sensors, barometers, and the like. Sensors 946 can be used to sense location aspects, such as auditory or light signatures of a location.

In some embodiments, mobile device 900 can include a GPS receiver, sometimes referred to as a GPS unit 948. A mobile device can use a satellite navigation system, such as the Global Positioning System (GPS), to obtain position information, timing information, altitude, or other navigation information. During operation, the GPS unit can receive signals from GPS satellites orbiting the Earth. The GPS unit analyzes the signals to make a transit time and distance estimation. The GPS unit can determine the current position (current location) of the mobile device. Based on these estimations, the mobile device can determine a location fix, altitude, and/or current speed. A location fix can be geographical coordinates such as latitudinal and longitudinal information.

One or more processors 918 run various software components stored in computer-readable medium 902 to perform various functions for mobile device 900. In some embodiments, the software components include an operating system 922, a communication module 924 (or set of instructions), a location/motion module 926 (or set of instructions), an update/idle scheduler 828 that is used as part of hitch reduction described herein, and other application programs 834 (or set of instructions).

Operating system 922 can be any suitable operating system, including iOS, Mac OS, Darwin, Quatros Real-Time Operating System (RTXC), LINUX, UNIX, OS X, WINDOWS, or an embedded operating system such as VxWorks. The operating system can include various procedures, sets of instructions, software components, and/or drivers for controlling and managing general system tasks (e.g., memory management, storage device control, power management, etc.) and facilitates communication between various hardware and software components.

Communication module 924 facilitates communication with other devices over one or more external ports 936 or via wireless circuitry 908 and includes various software components for handling data received from wireless circuitry 908 and/or external port 936. External port 936 (e.g., universal serial bus (USB), FireWire, Lightning connector, 60-pin connector, etc.) is adapted for coupling directly to other devices or indirectly over a network (e.g., the Internet, wireless LAN, etc.).

Location/motion module 926 can assist in determining the current position (e.g., coordinates or other geographic location identifiers) and motion of mobile device 900. Modern positioning systems include satellite based positioning systems, such as Global Positioning System (GPS), cellular network positioning based on "cell IDs," and Wi-Fi positioning technology based on a Wi-Fi networks. GPS also relies on the visibility of multiple satellites to determine a position estimate, which may not be visible (or have weak signals) indoors or in "urban canyons." In some embodiments, location/motion module 926 receives data from GPS unit 948 and analyzes the signals to determine the current position of the mobile device. In some embodiments, location/motion module 926 can determine a current location using Wi-Fi or cellular location technology. For example, the location of the mobile device can be estimated using knowledge of nearby cell sites and/or Wi-Fi access points with knowledge also of their locations. Information identifying the Wi-Fi or cellular transmitter is received at wireless circuitry 908 and is passed to location/motion module 926. In some embodiments, the location module receives the one or more transmitter IDs. In some embodiments, a sequence of transmitter IDs can be compared with a reference database (e.g., Cell ID database, Wi-Fi reference database) that maps or correlates the transmitter IDs to position coordinates of corresponding transmitters, and computes estimated position coordinates for mobile device 900 based on the position coordinates of the corresponding transmitters. Regardless of the specific location technology used, location/motion module 926 receives information from which a location fix can be derived, interprets that information, and returns location information, such as geographic coordinates, latitude/longitude, or other location fix data.

Update/Idle scheduler 928 can send/receive messages from applications 934 and from any or all of location/motion module 926, communications module 924, and operating system 922. In some embodiments, update/idle scheduler 928 can also interact directly with control circuitry 904 in order to obtain information about processor 918 or other components of mobile device 900. This information can include current time, processor 918 activity level, render module scheduling based on refresh rate, VSync, and other hardware or software limitations, and other information about mobile device 900.

Update/Idle scheduler 928 may also access information on operations requested from other portions of computer-readable medium 902. This information can accessed directly from computer-readable medium 02 or may be accessed through other components of mobile device 900 (e.g., external port 936, wireless circuitry 908, or other connection).

Dielectric-filled openings such as plastic-filled openings may be formed in metal portions of housing such as in metal sidewall structures (e.g., to serve as antenna windows and/or to serve as gaps that separate portions of antennas from each other).

Antennas may be mounted in housing. If desired, some of the antennas (e.g., antenna arrays that may implement beam steering, etc.) may be mounted under dielectric portions of mobile device 900 (e.g., portions of the display cover layer, portions of a plastic antenna window in a metal housing sidewall portion of housing, etc.). With one illustrative configuration, some or all of rear face of mobile device 900 may be formed from a dielectric. For example, the rear wall of housing may be formed from glass plastic, ceramic, other dielectric. In this type of arrangement, antennas may be mounted within the interior of mobile device 900 in a location that allows the antennas to transmit and receive antenna signals through the rear wall of mobile device 900 (and, if desired, through optional dielectric sidewall portions in housing). Antennas may also be formed from metal sidewall structures in housing and may be located in peripheral portions of mobile device 900.

To avoid disrupting communications when an external object such as a human hand or other body part of a user blocks one or more antennas, antennas may be mounted at multiple locations in housing. Sensor data such as proximity sensor data, real-time antenna impedance measurements, signal quality measurements such as received signal strength information, and other data may be used in determining when one or more antennas is being adversely affected due to the orientation of housing, blockage by a user's hand or other external object, or other environmental factors. Mobile device 900 can then switch one or more replacement antennas into use in place of the antennas that are being adversely affected.

Antennas may be mounted at the corners of housing, along the peripheral edges of housing, on the rear of housing, under the display cover layer that is used in covering and protecting display on the front of mobile device 900 (e.g., a glass cover layer, a sapphire cover layer, a plastic cover layer, other dielectric cover layer structures, etc.), under a dielectric window on a rear face of housing or the edge of housing, under a dielectric rear wall of housing, or elsewhere in mobile device 900. As an example, antennas may be mounted at one or both ends of mobile device 900 (e.g., along the upper and lower edges of housing, at the corners of housing, etc.).

Antennas in mobile device 900 may include cellular telephone antennas, wireless local area network antennas (e.g., Wi-Fi® antennas at 2.4 GHz and 5 GHz and other suitable wireless local area network antennas), satellite navigation system signals, and near-field communications antennas. The antennas may also include antennas that support IEEE 802.15.4 ultra-wideband communications protocols and/or antennas for handling millimeter wave communications. For example, the antennas may include two or more ultra-wideband frequency antennas and/or millimeter wave phased antenna arrays. Millimeter wave communications, which are sometimes referred to as extremely high frequency (EHF) communications, involve signals at 60 GHz or other frequencies between about 10 GHz and 300 GHz.

Wireless circuitry in mobile device 900 may support communications using the IEEE 802.15.4 ultra-wideband protocol. In an IEEE 802.15.4 system, a pair of devices may exchange wireless time stamped messages. Time stamps in the messages may be analyzed to determine the time of flight of the messages and thereby determine the distance (range) between the devices.

Image sensors 944 may include one or more visible digital image sensors (visible-light cameras) and/or one or more infrared digital image sensors (infrared-light cameras). Image sensors 944 may, if desired, be used to measure distances. For example, an infrared time-of-flight image sensor may be used to measure the time that it takes for an infrared light pulse to reflect back from objects in the vicinity of mobile device 900, which may in turn be used to determine the distance to those objects. Visible imaging systems such as a front and/or rear-facing camera in mobile device 900 may also be used to determine the position of objects in the environment. For example, control circuitry 904 may use image sensors 944 to perform simultaneous localization and mapping (SLAM). SLAM refers to the process of using images to determine the position of objections in the environment while also constructing a representation of the imaged environment. Visual SLAM techniques include detecting and tracking certain features in images such as edges, textures, room corners, window corners, door corners, faces, sidewalk edges, street edges, building edges, tree trunks, and other prominent features. Control circuitry 904 may rely entirely upon image sensors 944 to perform simultaneous localization and mapping, or control circuitry 904 may synthesize image data with range data from one or more distance sensors (e.g., light-based proximity sensors). If desired, control circuitry 904 may use display to display a visual representation of the mapped environment.

Input-output devices may include sensors 946, e.g., motion sensors. Sensors 946 may include one or more accelerometers (e.g., accelerometers that measure acceleration along one, two, or three axes), gyroscopes, barometers, magnetic sensors (e.g., compasses), image sensors (e.g., image sensor 944) and other sensor structures. Sensors 946 may, for example, include one or more microelectromechanical systems (MEMS) sensors (e.g., accelerometers, gyroscopes, microphones, force sensors, pressure sensors, capacitive sensors, or any other suitable type of sensor formed using microelectromechanical systems technology).

Control circuitry 904 may be used to store and process data about processor activity, power setting, data associated with an operation, and current time. If desired, processing circuitry and storage may form part of a system-on-chip integrated circuit (as an example).

Input-output devices may include movement generation circuitry. Movement generation circuitry may receive control signals from control circuitry 904. Movement generation circuitry may include electromechanical actuator circuitry that, when driven, moves mobile device 900 in one or more directions. For example, movement generation circuitry may laterally move mobile device 900 and/or may rotate mobile device 900 around one or more axes of rotation. Movement generation circuitry may, for example, include one or more actuators formed at one or more locations of mobile device 900. When driven by a motion control signal, actuators may move (e.g., vibrate, pulse, tilt, push, pull, rotate, etc.) to cause mobile device 900 to move or rotate in one or more directions. The movement may be slight (e.g., not noticeable or barely noticeable to a user of mobile device 900), or the movement may be substantial. Actuators may be based on one or more vibrators, motors, solenoids, piezoelectric actuators, speaker coils, or any other desired device capable of mechanically (physically) moving mobile device 900.

Some or all of movement generation circuitry such as actuators may be used to perform operations that are unrelated to rotation of mobile device 900. For example, actuators may include vibrators that are actuated to issue a haptic alert or notification to a user of mobile device 900. Such alerts may include, for example, a received text message alert identifying that mobile device 900 has received a text message, a received telephone call alert, a received email alert, an alarm notification alert, a calendar notification alert, or any other desired notification. By actuating actuator, mobile device 900 may inform the user of any desired device condition.

Motion sensor circuitry may sense motion of mobile device 900 that is generated by movement generation circuitry. If desired, motion sensor circuitry may provide feedback signals associated with the sensed motion of mobile device 900 to movement generation circuitry. Movement generation circuitry may use the feedback signals to control actuation of the movement generation circuitry.

Control circuitry 904 may use motion sensor circuitry and/or movement generation circuitry to determine the angle of arrival of wireless signals received by mobile device 900 from another electronic device. For example, control circuitry 904 may use movement generation circuitry to move mobile device 900 from one position to another. Motion sensor circuitry may be used to track the movement of mobile device 900 as it is moved between the different positions. At each position, control circuitry 904 may receive wireless signals from another electronic device. Control circuitry 904 may process the received wireless signals together with the motion data from motion sensor circuitry to more accurately determine the position of the other electronic device. The use of motion generation circuitry is merely illustrative, however. If desired, motion sensor circuitry may track movement of mobile device 900 that is not caused by motion generation circuitry. This may include a user's natural, unprompted movement of mobile device 900 and/or the user's movement of mobile device 900 after the user is prompted (by display, audio circuitry 910, a haptic output device in mobile device 900, or any other suitable output device) to move mobile device 900 in a particular fashion.

Other sensors that may be included in input-output devices include ambient light sensors for gathering information on ambient light levels, proximity sensor components (e.g., light-based proximity sensors, capacitive proximity sensors, and/or proximity sensors based on other structures), depth sensors (e.g., structured light depth sensors that emit beams of light in a grid, a random dot array, or other pattern, and that have image sensors that generate depth maps based on the resulting spots of light produced on target objects), sensors that gather three-dimensional depth information using a pair of stereoscopic image sensors, LIDAR (light detection and ranging) sensors, radar sensors, and other suitable sensors.

Input-output circuitry may include wireless communications circuitry for communicating wirelessly with external equipment. Wireless communications circuitry may include radio frequency (RF) transceiver circuitry formed from one or more integrated circuits, power amplifier circuitry, low-noise input amplifiers, passive RF components, one or more antennas, transmission lines, and other circuitry for handling RF wireless signals. Wireless signals can also be sent using light (e.g., using infrared communications).

Wireless circuitry 908 may include radio-frequency transceiver circuitry for handling various radio-frequency communications bands. For example, wireless circuitry 908 may include transceiver circuitry.

Transceiver circuitry may be wireless local area network transceiver circuitry. Transceiver circuitry may handle 2.4 GHz and 5 GHz bands for Wi-Fi® (IEEE 802.11) communications and may handle the 2.4 GHz Bluetooth® communications band.

Circuitry may use cellular telephone transceiver circuitry for handling wireless communications in frequency ranges such as a communications band from 700 to 960 MHz, a band from 1710 to 2170 MHz, a band from 2300 to 2700 MHz, other bands between 700 and 2700 MHz, higher bands such as LTE bands 42 and 43 (3.4-3.6 GHz), or other cellular telephone communications bands. Circuitry may handle voice data and non-voice data.

Millimeter wave transceiver circuitry (sometimes referred to as extremely high frequency transceiver circuitry) may support communications at extremely high frequencies (e.g., millimeter wave frequencies such as extremely high frequencies of 10 GHz to 400 GHz or other millimeter wave frequencies). For example, circuitry may support IEEE 802.11ad communications at 60 GHz. Circuitry may be formed from one or more integrated circuits (e.g., multiple integrated circuits mounted on a common printed circuit in a system-in-package device, one or more integrated circuits mounted on different substrates, etc.).

Ultra-wideband transceiver circuitry may support communications using the IEEE 802.15.4 protocol and/or other wireless communications protocols. Ultra-wideband wireless signals may be characterized by bandwidths greater than 400 MHz or bandwidths exceeding 20% of the center frequency of radiation. The presence of lower frequencies in the baseband may allow ultra-wideband signals to penetrate through objects such as walls. Transceiver circuitry may operate in a 2.4 GHz frequency band, a 6.5 GHz frequency band, an 8 GHz frequency band, and/or at other suitable frequencies.

Wireless communications circuitry may include satellite navigation system circuitry such as Global Positioning System (GPS) receiver circuitry for receiving GPS signals at 1575 MHz or for handling other satellite positioning data (e.g., GLONASS signals at 1609 MHz). Satellite navigation system signals for receiver are received from a constellation of satellites orbiting the earth.

In satellite navigation system links, cellular telephone links, and other long-range links, wireless signals are typically used to convey data over thousands of feet or miles. In Wi-Fi® and Bluetooth® links at 2.4 and 5 GHz and other short-range wireless links, wireless signals are typically used to convey data over tens or hundreds of feet. Extremely high frequency (EHF) wireless transceiver circuitry may convey signals over these short distances that travel between transmitter and receiver over a line-of-sight path. To enhance signal reception for millimeter wave communications, phased antenna arrays and beam steering techniques may be used (e.g., schemes in which antenna signal phase and/or magnitude for each antenna in an array is adjusted to perform beam steering). Antenna diversity schemes may also be used to ensure that the antennas that have become blocked or that are otherwise degraded due to the operating environment of mobile device 900 can be switched out of use and higher-performing antennas used in their place.

Wireless communications circuitry can include circuitry for other short-range and long-range wireless links if desired. For example, wireless communications circuitry 36 may include circuitry for receiving television and radio signals, paging system transceivers, near field communications (NFC) circuitry, etc.

The one or more applications 934 on mobile device 900 can include any applications installed on the mobile device 900, including without limitation, a browser, address book, contact list, email, instant messaging, social networking, word processing, keyboard emulation, widgets, JAVA-enabled applications, encryption, digital rights management, voice recognition, voice replication, a music player (which plays back recorded music stored in one or more files, such as MP3 or advanced audio codec (AAC) files), etc.

There may be other modules or sets of instructions (not shown), such as a graphics module, a time module, etc. For example, the graphics module can include various conventional software components for rendering, animating and displaying graphical objects (including without limitation text, web pages, icons, digital images, animations, and the like) on a display surface. In another example, a timer module can be a software timer. The timer module can also be implemented in hardware. The time module can maintain various timers for any number of events.

I/O subsystem 906 can be coupled to a display system (not shown), which can be a touch-sensitive display. The display displays visual output to the user in a GUI. The visual output can include text, graphics, video, and any combination thereof. Some or all of the visual output can correspond to user-interface objects. A display can use LED (light emitting diode), LCD (liquid crystal display) technology, or LPD (light emitting polymer display) technology, although other display technologies can be used in other embodiments.

In some embodiments, I/O subsystem 906 can include a display and user input devices such as a keyboard, mouse, and/or trackpad. In some embodiments, I/O subsystem 906 can include a touch-sensitive display. A touch-sensitive display can also accept input from the user based at least part on haptic and/or tactile contact. In some embodiments, a touch-sensitive display forms a touch-sensitive surface that accepts user input. The touch-sensitive display/surface (along with any associated modules and/or sets of instructions in computer-readable medium 902) detects contact (and any movement or release of the contact) on the touch-sensitive display and converts the detected contact into interaction with user-interface objects, such as one or more soft keys, that are displayed on the touch screen when the contact occurs. In some embodiments, a point of contact between the touch-sensitive display and the user corresponds to one or more digits of the user. The user can make contact with the touch-sensitive display using any suitable object or appendage, such as a stylus, pen, finger, and so forth. A touch-sensitive display surface can detect contact and any movement or release thereof using any suitable touch sensitivity technologies, including capacitive, resistive, infrared, and surface acoustic wave technologies, as well as other proximity sensor arrays or other elements for determining one or more points of contact with the touch-sensitive display.

Further, I/O subsystem 906 can be coupled to one or more other physical control devices (not shown), such as pushbuttons, keys, switches, rocker buttons, dials, slider switches, sticks, LEDs, etc., for controlling or performing various functions, such as power control, speaker volume control, ring tone loudness, keyboard input, scrolling, hold, menu, screen lock, clearing and ending communications and the like. In some embodiments, in addition to the touch screen, mobile device 900 can include a touchpad (not shown) for activating or deactivating particular functions. In some embodiments, the touchpad is a touch-sensitive area of the mobile device 900 that, unlike the touch screen, does not display visual output. The touchpad can be a touch-sensitive surface that is separate from the touch-sensitive display or an extension of the touch-sensitive surface formed by the touch-sensitive display.

In some embodiments, some or all of the operations described herein can be performed using an application executing on the user's device. Circuits, logic modules, processors, and/or other components may be configured to perform various operations described herein. Those skilled in the art will appreciate that, depending on implementation, such configuration can be accomplished through design, setup, interconnection, and/or programming of the particular components and that, again depending on implementation, a configured component might or might not be reconfigurable for a different operation. For example, a programmable processor can be configured by providing suitable executable code; a dedicated logic circuit can be configured by suitably connecting logic gates and other circuit elements; and so on.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission. A suitable non-transitory computer readable medium can include random access memory (RAM), a read only memory (ROM), a magnetic medium such as a hard-drive or a floppy disk, or an optical medium, such as a compact disk (CD) or DVD (digital versatile disk), flash memory, and the like. The computer readable medium may be any combination of such storage or transmission devices.

Computer programs incorporating various features of the present disclosure may be encoded on various computer readable storage media; suitable media include magnetic disk or tape, optical storage media, such as compact disk (CD) or DVD (digital versatile disk), flash memory, and the like. Computer readable storage media encoded with the program code may be packaged with a compatible device or provided separately from other devices. In addition, program code may be encoded and transmitted via wired optical, and/or wireless networks conforming to a variety of protocols, including the Internet, thereby allowing distribution, e.g., via Internet download. Any such computer readable medium may reside on or within a single computer product (e.g. a solid state drive, a hard drive, a CD, or an entire computer system), and may be present on or within different computer products within a system or network. A computer system may include a monitor, printer, or other suitable display for providing any of the results mentioned herein to a user.

What is claimed is:

1. A method comprising performing, by a computing device:
    performing a first operation before a first commit deadline, wherein a first result of the first operations is used for rendering a first frame;
    displaying the first frame in a first cycle on a display of the computing device;
    performing a second operation having a second result used for rendering a second frame for a second cycle, the second operation completed before a second commit deadline for the second cycle;
    determining a remaining time to a third commit deadline relative to a current time;
    predicting a third operation to be performed before the third commit deadline for a third cycle;
    predicting an additional operation to be performed for cycles after the third cycle;
    determining that a total processing time of the third operation and the additional operation is less than the remaining time to the third commit deadline;
    responsive to determining that the total processing time is less than the remaining time, performing the third operation and the additional operation to be used in a future cycle;
    rendering, using a third result of the third operation, a third frame for the third cycle; and
    rendering, using an additional result of the additional operation, an additional frame for the future cycle before a future render deadline for the future cycle.

2. The method of claim 1, wherein the first commit deadline, the second commit deadline, and the third commit deadline are determined based on a refresh rate.

3. The method of claim 1, wherein the first commit deadline, the second commit deadline, and the third commit deadline have a variable periodicity.

4. The method of claim 1, wherein the additional operation is a prefetch operation.

5. The method of claim 1, wherein the second operation is responsive to a scrolling operation at a user interface of the computing device, and wherein the scrolling operation does not cause a portion of a new image to be displayed on the display of the computing device.

6. The method of claim 5, wherein the additional operation results in at least a portion of a new image to be displayed.

7. The method of claim 1, wherein the remaining time is determined by an update scheduler, and wherein the third operation and the additional operation are predicted using a prediction engine that predicts operations based on a current frame and an order of images to be displayed by an application.

8. The method of claim 1, wherein the additional operation is selected from among a plurality of operations that have a likelihood of future operation that is above a threshold.

9. A method comprising performing, by a computing device having commit deadlines with a variable periodicity:
    performing a first operation before a first commit deadline having a first period as measured between a previous commit deadline and the first commit deadline, wherein a first result of the first operations is used for rendering a first frame, wherein the first operation is implemented using one or more processing elements using a first power setting;
    displaying the first frame in a first cycle on a display of the computing device;
    identifying a second operation having a second result to be used for rendering a second frame for a second cycle, the second operation to be completed before a second commit deadline for the second cycle, the second commit deadline having a second period as measured from the first commit deadline to the second commit deadline, the second period different from the first period;
    determining a second power setting of one or more processing elements such that the one or more processing elements complete the second operation before the second commit deadline, wherein the second power setting is lower than the first power setting;
    performing the second operation using the one or more processing elements executing with the second power setting; and
    rendering, using the second result of the second operation, the second frame for the second cycle.

10. The method of claim 9, wherein determining the second power setting includes:
    determining a remaining time to the second commit deadline relative to a current time;
    determining a completion time using the first power setting; and
    comparing the completion time to the remaining time to determine the second power setting.

11. The method of claim 9, wherein the first commit deadline and the second commit deadline are determined based on a refresh rate.

12. The method of claim 9, wherein determining the second power setting is performed by a scheduler that interfaces with a user interface routine, and wherein the scheduler instructs the one or more processing elements to use the second power setting.

13. The method of claim 12, wherein the scheduler estimates a completion time using the second power setting to be less than a remaining time before the second commit deadline.

14. The method of claim 9, wherein determining the second power setting is performed by a performance controller that receives information about commit deadlines and adjusts a power setting of the one or more processing elements.

15. An electronic device comprising:
a memory storing a plurality of instructions; and
one or more processors communicably coupled with the memory, wherein the one or more processors are further configured to execute the plurality of instructions to perform a method comprising:
performing a first operation before a first commit deadline, wherein a first result of the first operations is used for rendering a first frame;
displaying the first frame in a first cycle on a display of the electronic device;
performing a second operation having a second result used for rendering a second frame for a second cycle, the second operation completed before a second commit deadline for the second cycle;
determining a remaining time to a third commit deadline relative to a current time;
predicting a third operation to be performed before the third commit deadline for a third cycle;
predicting an additional operation to be performed for cycles after the third cycle;
determining that a total processing time of the third operation and the additional operation is less than the remaining time to the third commit deadline;
responsive to determining that the total processing time is less than the remaining time, performing the third operation and the additional operation to be used in a future cycle;
rendering, using a third result of the third operation, a third frame for the third cycle; and
rendering, using an additional result of the additional operation, an additional frame for the future cycle before a future render deadline for the future cycle.

16. The electronic device of claim 15, wherein the first commit deadline, the second commit deadline, and the third commit deadline are determined based on a refresh rate.

17. The electronic device of claim 15, wherein the additional operation is a prefetch operation.

18. The electronic device of claim 15, wherein the second operation is responsive to a scrolling operation at a user interface of the electronic device, and wherein the scrolling operation does not cause a portion of a new image to be displayed on the display of the electronic device.

19. The electronic device of claim 15, wherein the remaining time is determined by an update scheduler, and wherein the third operation and the additional operation are predicted using a prediction engine that predicts operations based on a current frame and an order of images to be displayed by an application.

* * * * *